(12) United States Patent
Backhaus et al.

(10) Patent No.: US 9,961,522 B2
(45) Date of Patent: *May 1, 2018

(54) PROVISION OF ADDITIONAL NETWORK ADDRESSABLE NUMBERS ON SINGLE MOBILE DEVICE

(71) Applicant: Movius Interactive Corporation, Johns Creek, GA (US)

(72) Inventors: George Backhaus, Suwanee, GA (US); Jignesh Gandhi, Duluth, GA (US); Julio Gonzalez, Tucker, GA (US); John Green, Rosewell, GA (US); Philip Lowman, Ellijay, GA (US); Paul Rubenstein, Johns Creek, GA (US); Mike Speanburg, Lawrenceville, GA (US)

(73) Assignee: Movius Interactive Corporation, Johns Creek, GA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/081,822

(22) Filed: Mar. 25, 2016

(65) Prior Publication Data

US 2016/0212614 A1    Jul. 21, 2016

Related U.S. Application Data

(63) Continuation of application No. 13/920,056, filed on Jun. 17, 2013, now Pat. No. 9,332,425, which is a
(Continued)

(51) Int. Cl.
*H04W 40/02* (2009.01)
*H04W 4/16* (2009.01)
(Continued)

(52) U.S. Cl.
CPC ........... *H04W 4/16* (2013.01); *H04L 65/1046* (2013.01); *H04L 65/1069* (2013.01);
(Continued)

(58) Field of Classification Search
CPC ........... H04W 4/16; H04W 4/14; H04W 8/26; H04W 76/02; H04W 40/00; H04W 4/24;
(Continued)

(56) References Cited

U.S. PATENT DOCUMENTS 8,064,582 B2 * 11/2011 Ma ................. H04M 15/06
                                                   379/142.06
9,338,305 B2 * 5/2016 Li ..................... H04M 3/42195
(Continued)

*Primary Examiner* — Khawar Iqbal
(74) *Attorney, Agent, or Firm* — Smith Tempel Blaha LLC; Gregory Scott Smith

(57) ABSTRACT

A method for routing calls between a third party telecommunications device ("TD") and a subscriber TD associated with a primary service and a second line service ("SLS") involves associating the SLS number of the subscriber, the primary number of the subscriber and the primary number of a third party via a common relationship number. Calls directed from a third party to the SLS number of a subscriber are routed to an SLS platform and redirected to the subscriber TD. Calls directed from the subscriber TD to the third party use the relationship number to route the call to the SLS platform. The combination of the primary service number and the relationship number identifies the third party number for call completion. Calls can be directed to and from an SLS number of a subscriber TD using a combination of protocols such as ISUP, CAP and SIP.

4 Claims, 14 Drawing Sheets

Related U.S. Application Data continuation-in-part of application No. 13/466,074, filed on May 7, 2012, now Pat. No. 9,332,408.

(60) Provisional application No. 61/660,772, filed on Jun. 17, 2012.

(51) Int. Cl.

| | |
|---|---|
| *H04W 12/02* | (2009.01) |
| *H04M 3/42* | (2006.01) |
| *H04W 4/14* | (2009.01) |
| *H04L 29/06* | (2006.01) |
| *H04W 8/26* | (2009.01) |
| *H04W 76/02* | (2009.01) |
| *H04M 3/54* | (2006.01) |
| *H04M 7/12* | (2006.01) |

(52) U.S. Cl.
CPC ......... *H04M 3/42255* (2013.01); *H04M 3/54* (2013.01); *H04M 7/127* (2013.01); *H04W 4/14* (2013.01); *H04W 8/26* (2013.01); *H04W 76/02* (2013.01)

(58) Field of Classification Search
CPC ............... H04W 12/02; H04L 65/1046; H04L 65/1069; H04M 3/42255; H04M 3/54; H04M 7/127; H04M 15/00; H04M 3/42008; H04M 3/42229
USPC ............ 455/411, 414.1–414.4, 417, 433; 379/142.09, 142.02, 142.06
See application file for complete search history.

(56) References Cited

U.S. PATENT DOCUMENTS

| | | | |
|---|---|---|---|
| 2007/0105531 A1* | 5/2007 | Schroeder, Jr. ... | H04M 3/42008 455/411 |
| 2007/0130465 A1* | 6/2007 | Zeng .................. | G06F 21/31 713/171 |
| 2009/0209236 A1* | 8/2009 | Bloebaum ............ | G06N 3/006 455/414.1 |
| 2010/0177662 A1* | 7/2010 | Meincke ............... | H04M 15/00 370/254 |
| 2012/0282903 A1* | 11/2012 | Rabra ............... | H04M 3/42272 455/414.1 |
| 2012/0323686 A1* | 12/2012 | Burger ................. | G06F 21/316 705/14.55 |
| 2013/0095791 A1* | 4/2013 | Bennett .................. | H04L 63/30 455/411 |
| 2013/0115921 A1* | 5/2013 | Szesztay ........... | H04M 3/42008 455/411 |
| 2013/0254854 A1* | 9/2013 | Moganti ................ | H04L 63/20 726/5 |
| 2013/0295892 A1 | 11/2013 | Backhaus et al. | |
| 2013/0295899 A1 | 11/2013 | Lowman et al. | |
| 2015/0079998 A1 | 3/2015 | Lowman et al. | |
| 2015/0215459 A1* | 7/2015 | Kirchhoff ............ | H04M 3/436 379/266.07 |
| 2015/0271336 A1 | 9/2015 | Backhaus et al. | |
| 2015/0271731 A1 | 9/2015 | Backhaus et al. | |
| 2015/0271774 A1 | 9/2015 | Backhaus et al. | |
| 2015/0281948 A1 | 10/2015 | Backhaus et al. | |
| 2016/0014630 A1* | 1/2016 | Xu ........................ | H04W 24/02 370/252 |
| 2016/0021248 A1 | 1/2016 | Backhaus et al. | |

* cited by examiner

315
Subscriber Relationship ID Table

| Subscriber Contact | Relationship Number | 3rd Party Number |
|---|---|---|
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Local SLS Database 106

FIG. 3B

PROVISION OF ADDITIONAL NETWORK ADDRESSABLE NUMBERS ON SINGLE MOBILE DEVICE

CROSS-REFERENCE

This application is a continuation of currently pending U.S. application for patent entitled "System and Method for Provision of a Second Line Service to a Telecommunications Device using Mixed Protocols" filed on Nov. 7, 2013 and assigned Ser. No. 13/920,056, which application is a Continuation-In-Part of United States Application for Patent filed on May 7, 2012, entitled SYSTEM AND METHOD FOR PROVISION OF A SECOND LINE SERVICE TO A TELECOMMUNICATIONS DEVICE and assigned Ser. No. 13/466,074, the entire contents of which are hereby incorporated by reference and which application claims priority under 35 U.S.C. § 119(e) to U.S. provisional application entitled "CROSS CARRIER MOBILE DEVICE CLIENT USING DATA CHANNEL FOR SIP CALL," filed on Jun. 17, 2012 and assigned application Ser. No. 61/660,772, the entire contents of all of which are hereby incorporated by reference.

BACKGROUND

In simpler times, communication meant a face to face conversation, a hand written note or, perhaps, a phone call between two land lines. Times have changed. People today communicate constantly and simultaneously via myriad channels, most of which are mobile. Of all the means of communication available to today's users, the cellular telephone may be the most ubiquitous. It seems that everybody has one and that everybody uses their mobile device to stay connected, keep their busy lives moving forward, and fulfill their endless responsibilities.

For many people, those endless responsibilities are of a personal and professional mix. Fielding phone calls and texts from family and friends on the same mobile device from which you endeavor to conduct business is a recipe for confusion. When taking a call from your top client, it's probably a good idea to avoid getting it mixed up with a call from your spouse. The greeting "Hey, Honey!" can undermine even the best of business relationships.

To keep the personal and business channels of communication separated, many people simply carry two separate mobile devices, each with its own dedicated phone number and service options. If mobile device "A" rings, the user knows it's of a personal nature. If mobile device "B" rings, the user knows that it's a business related call. Although carrying two mobile devices with you is one solution for keeping personal and business demands separate, keeping track of two mobile devices and their related service plans, however, can be frustrating and expensive.

For many users, porting a second phone number to a single device makes more sense—in doing so, at least the number of devices that must be kept up with in order to keep personal and business matters segregated have been reduced. But current systems and methods for managing multiple numbers on a single device are not without issues. For example, adding a second line to a service plan often dictates that the user have a more expensive "family plan" established with the service provider and often there still is no good way to know which number a calling party has dialed. Using a dual-SIM ("subscriber identity module") phone is another solution, with each SIM card being dedicated to a separate line, but the cost of redundant service plans to accommodate the multiple SIM cards, not to mention the cost of the dual-SIM phone itself, can be exorbitant.

Another solution is to offer a second line number in the form of a virtual number. Calls to the virtual number are intercepted and forwarded to the primary number of a subscriber's mobile device. To distinguish that the incoming call was originally directed to the virtual number as opposed to the primary number associated with the device, virtual number services known in the art simply populate a calling party field with the virtual number. The user sees the virtual number on the caller ID display and knows that the incoming call was made to the virtual number. If the virtual number is being used for a business venture, for example, seeing the virtual number on the caller ID display prompts the user to answer the call with an appropriate greeting. Notably, however, in some virtual number services the user of the virtual number service has no way of identifying the source of the incoming call—he can only know that the incoming call was made to the virtual number.

In other virtual number services, the problem of identifying the call as an incoming call to the virtual number without sacrificing the ability to also know the source of the incoming call is solved with the addition of a dialable prefix to the incoming call identification (e.g., 88*770.283.5555). Notably, however, to provide such a solution the virtual number service must work in cooperation with the subscriber's primary service provider so that the dialable prefix is acknowledged as a trigger to forward the incoming call to the subscriber's device.

Accordingly, what is needed is a system and method for providing a plurality of dedicated phone numbers to a single telecommunications device in such a manner that the user of the device can separate and manage communications on each. Further, what is needed is a system and method for providing a second line service to a device in such a manner that only a single primary phone number is required from the device's primary service provider. Even further, what is needed is a system and method for providing a second line service to a device in such a manner that the second line service can be provided to the subscriber without having to coordinate with the subscriber's primary service provider.

SUMMARY OF THE DISCLOSURE

A method and system are described for routing calls between a third party telecommunications device ("TD") and a subscriber TD associated with a primary service and a second line service ("SLS"). An exemplary method according to one aspect includes receiving a call at an SLS platform that is interposed between a network of a primary service provider to the subscriber TD and a network of a primary service provider to the third party TD. The call, although directed by the third party TD to the subscriber TD associated with the second line service, is routed to the SLS platform.

Upon receiving the call, the SLS platform queries a local database of the SLS platform to identify a relationship number that serves to map the subscriber's primary number to the combination of the third party calling number and the subscriber's second line number. The call is then redirected to the primary number of the subscriber's TD and the call is completed. Notably, the relationship number and third party calling number combination may be forwarded to the subscriber TD, thus enabling an application on the subscriber TD to save the combination in a local database of the subscriber TD.

Advantageously, the relationship number can be used at a later time should the subscriber desire to call the third party. Dialing the third party number from the SLS application on the subscriber TD causes the relationship number for the third party to be dialed. As such, the call is actually routed to the SLS platform which subsequently uses the second line service number of the subscriber TD and the relationship number that routed the call to the SLS platform to determine the actual third party called number. Using the actual third party called number, the SLS platform completes the second leg of the call. In certain embodiments, a call leg between a subscriber device and the SLS platform may be completed using a session initiated protocol ("SIP") so that the data service provided by the primary service provider of the subscriber device is used in lieu of a voice channel.

Another exemplary method according to a second aspect includes receiving at an SLS platform a first-time call to a number associated with a third party TD, the SLS platform being interposed between a network of a primary service provider to the subscriber TD and a network of a primary service provider to the third party TD. The call may be directed to the SLS platform via a new relationship number selected by the SLS client application running on the subscriber TD. In such case, the relationship number routes to the SLS platform and the third party number is provided to the SLS platform from the subscriber TD. In other embodiments, the new SLS client number may be requested from the SLS platform before making the call and then used by the subscriber TD to make the call to the third party via the SLS platform. In either case, a new relationship number is used to direct an SLS call from the subscriber TD to the SLS platform.

In the databases located at the subscriber TD and the SLS platform, the new relationship number maps the subscriber's primary number to the combination of the third party number and the subscriber's second line number. The call is redirected by the SLS platform to the number associated with the third party TD and the call is completed.

Advantageously, the new relationship number can be used at a later time should the subscriber desire to call the third party. Dialing the third party number from the SLS application on the subscriber TD causes the relationship number for the third party to be dialed. As such, the call is actually routed to the SLS platform which subsequently uses the second line service number of the subscriber TD and the relationship number that routed the call to the SLS platform to determine the actual third party called number. Using the actual third party called number, the SLS platform completes the second leg of the call. As mentioned above and described below, in certain embodiments a call leg between a subscriber device and the SLS platform may be completed using a session initiated protocol ("SIP") so that the data service provided by the primary service provider of the subscriber device is used in lieu of a voice channel.

By associating the SLS number of the subscriber, the primary number of the subscriber and the primary number of a third party via a common relationship number, calls can be directed to and from a second service line of a subscriber TD without having to provide the second line service through the subscriber's primary service provider. Even so, in some embodiments, the subscriber's primary service provider may also be the second line service provider.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIGS. 3A-3B illustrate exemplary data tables that may be leveraged by a redirection module of an SLS platform and an SLS module of a subscriber TD to provide a second line service to a user of the subscriber TD.

DETAILED DESCRIPTION

Figure 1:
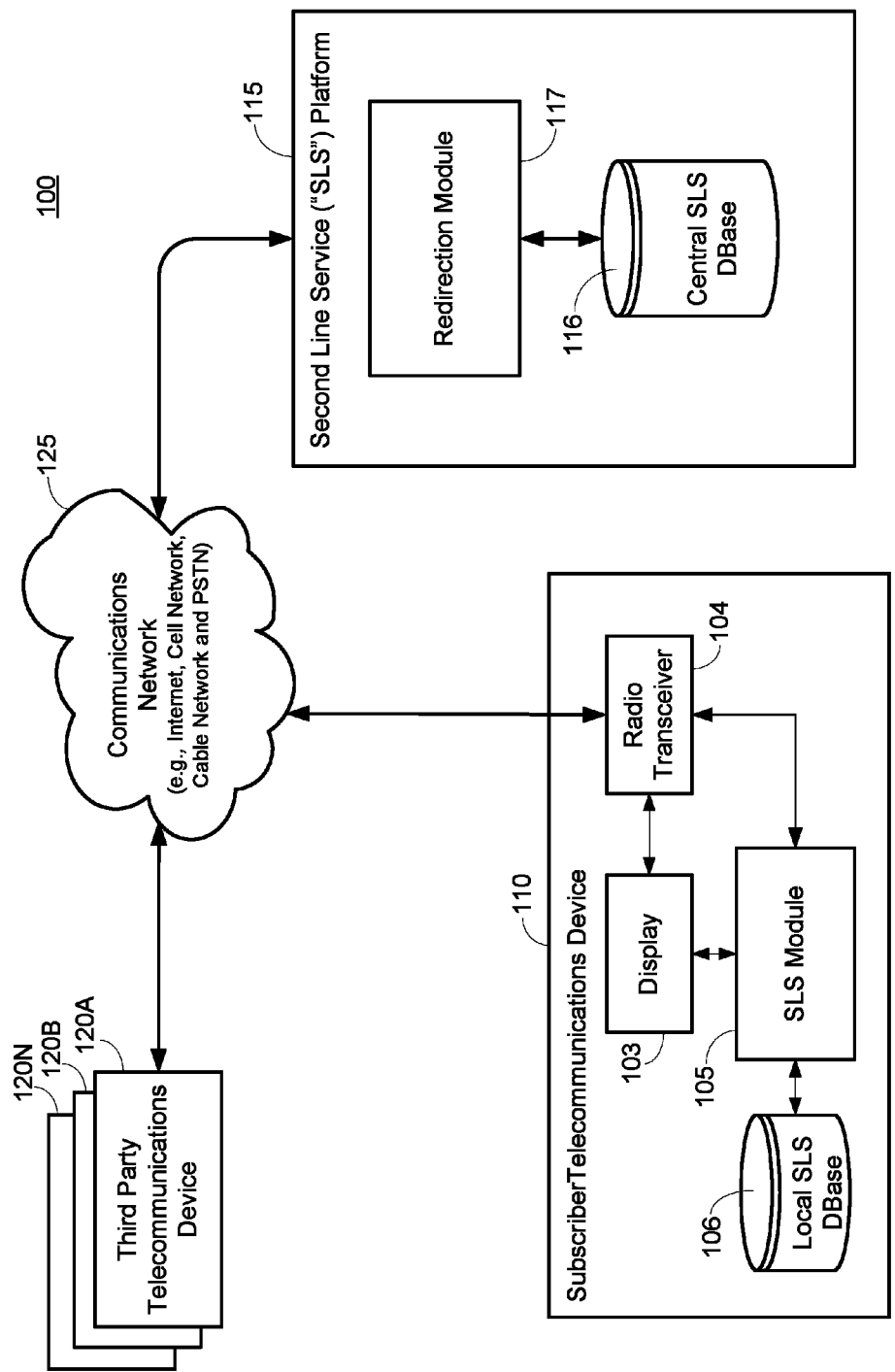
FIG. 1 is a high level diagram illustrating exemplary components of a system for providing a second line service ("SLS") to a user of telecommunications device ("TD").

The word "exemplary" is used herein to mean "serving as an example, instance, or illustration." Any aspect described herein as "exemplary" is not necessarily to be construed as preferred or advantageous over other aspects.

In this description, the terms "application" and "app" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), or a hand-held computer with a wireless connection or link.

In this description, the terms "call" and "communication," in their noun forms, envision any data transmission routed across a network from one device to another including, but not limited to, a voice transmission, a text message, a video message, a page, a data transmission, etc.

Referring to FIG. 1, depicted is a high level diagram illustrating exemplary components of a system 100 for providing a second line service to a user of Subscriber Telecommunications Device ("TD") 110. TD 110 is also associated with a primary phone number assigned to it by a primary service provider, as is understood by one of ordinary skill in the art. A subscriber to a second line service ("SLS") offered through exemplary system 100 may receive calls at TD 110 that are directed to either of the primary phone number provided by the primary service provider or the secondary phone number ("SLS phone number") provided, serviced and or facilitated by the SLS platform 115. Notably, depending on the particular embodiment, the primary service provider and the SLS platform (i.e., the second line service provider) may be the same provider or different providers. In embodiments where the primary service provider and the second line service provider are different providers, the subscriber may receive separate billing records from each provider. However, it is envisioned that certain embodiments where the primary service provider and the second line service provider are not one and the same may take advantage of session initiated protocols ("SIP") to simplify billing records for the user. A more detailed description of embodiments that use SIP protocols is provided below relative to FIG. 7.

In general, any call directed to either of the primary phone number or the SLS phone number are transmitted from a third party TD 120 to the subscriber TD 110 by way of communications network 125. Notably, communications network 125 envisions any and all networks for transmitting and terminating communications between telecommunications devices such as, but not limited to, cellular networks, PSTNs, cable networks and the Internet. Methods for effecting the transmission of data across communications network 125 from one device to another, including call setups, terminations and the like are understood by those of ordinary skill in the art of data transmission and may include the use of protocols and standards such as, but not limited to, signaling system seven ("SS7") protocol suite, SIP, customized applications for mobile networks enhanced logic ("CAMEL") or CAMEL Application Part ("CAP"), remote operations service element ("ROSE"), Voice Over IP ("VOIP"), etc. Notably, while the use of any particular protocol or communications standard may be a novel aspect of a particular embodiment of the systems and methods, it will be understood that the scope of the systems and methods disclosed herein is not limited to the use of any particular protocol or combination of protocols.

A call made from a third party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CLID"), i.e. the phone number, associated with third party TD 120 such that when the call is received at subscriber TD 110, the CLID may be displayed for the benefit of the subscriber on display component 103. Notably, although the exemplary embodiments described in the present disclosure use the CLID as an example of data that may be displayed for the benefit of the user of a subscriber TD 110, it will be understood that any data associated with the third party TD 120, subscriber TD 110, SLS platform 115 or the like may be rendered for the benefit of the user of the system 100 and, as such, only describing that the CLID is displayed will not limit the scope of what is envisioned by the disclosure. Moreover, it is envisioned that any data uniquely associated with a call to a primary number or an SLS number may be displayed for the benefit of a subscriber to the system 100.

Returning to the FIG. 1 illustration, a call made from a third party TD 120 to an SLS number associated with subscriber TD 110 is transmitted across network 125. As one of ordinary skill in the art will be aware, the network 125 recognizes where the call needs to be routed based on the called number (the SLS number associated with the subscriber) and routes the call to SLS platform 115. SLS platform 115 thus effectively intercepts the call, determines that the call was intended for subscriber TD 110 and then takes actions such that the call can be terminated at the subscriber TD 110. In this way, while a call directed to a primary number associated with subscriber TD 110 is routed directly to subscriber TD 110, a call directed to a second line number associated with subscriber TD 110 is routed to SLS platform 115 instead. Once received at SLS platform 115, a query of central SLS database 116 by redirection module 117 may determine that the call from third party TD 120 was meant for the second line number associated with the subscriber associated with TD 110. Once the determination is made, redirection module 117 may modify the call data to include data that reflects its identification as a call for the second line number and then cause the call to be available for termination at the primary number associated with subscriber TD 110.

Because the call includes data identifying it as a call to the second line number associated with subscriber TD 110, SLS module 105 may intercept the incoming call, or otherwise be injected into the call processing activity for the call, and then leverage data stored in local SLS database 106 to render it in such a way that the user or subscriber associated with TD 110 knows that the call is for the second line number as opposed to the primary number. The SLS module 105 is designed to work with radio transceiver 104 and any stored or retrievable content in local SLS database 106 to terminate a call to a second line number, render associated data and provide services uniquely associated with the second line number such as, but not limited to, dedicated voicemail, ringtones, caller ID, automated responses, etc.

A more detailed description of the exemplary method, including exemplary methods for receiving a call from a third party TD 120 and making a call to a third party TD 120 by way of the SLS platform 115 will be described below relative to FIGS. 4-7.

Figure 2:
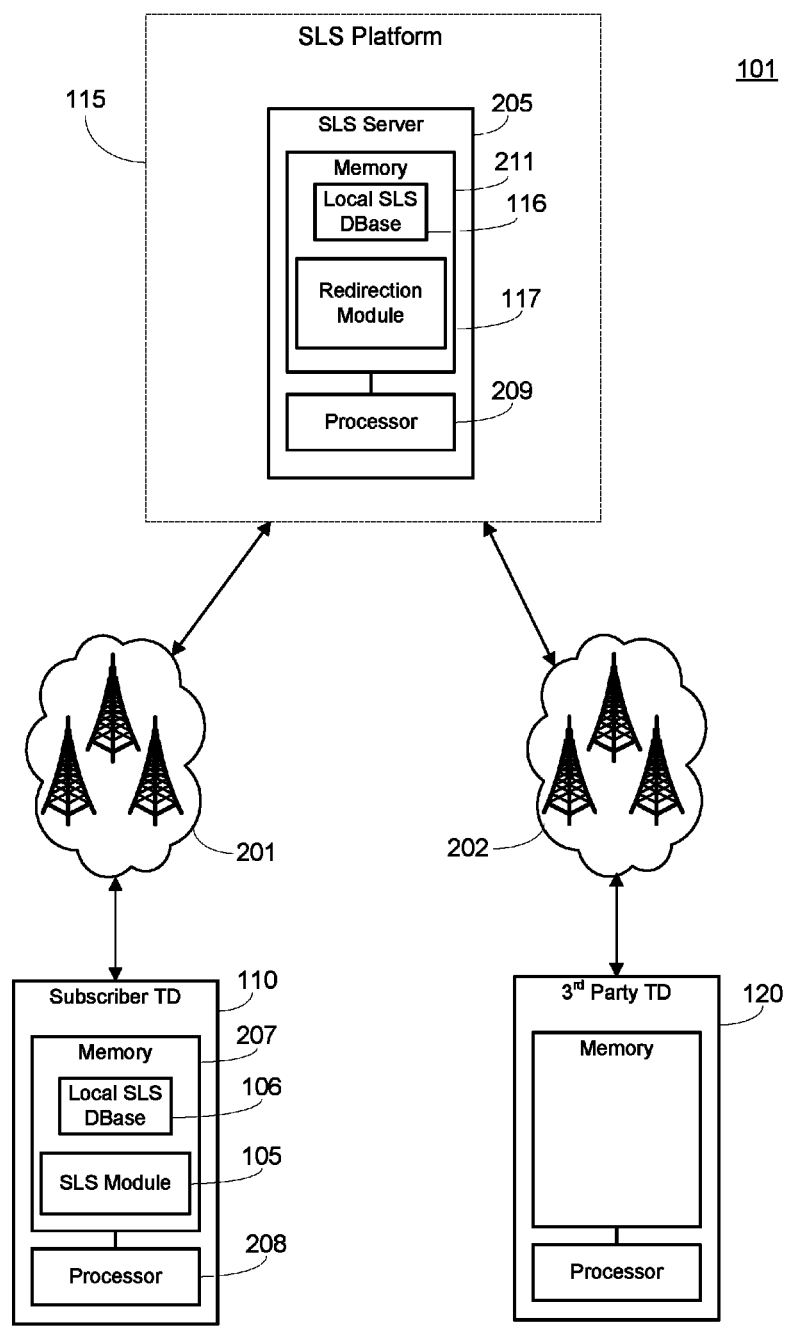
FIG. 2 is a diagram of an exemplary computer architecture for the system of FIG. 1.

Referring to FIG. 2, a diagram of exemplary computer architecture 101 for the system 100 of FIG. 1 is depicted. The exemplary architecture 101 may include a subscriber telecommunications device ("TD") 110 and a third party TD 120. Notably, although the third party TD 120 is not illustrated to suggest that it, like TD 110, is equipped with SLS capability, it is envisioned that in some embodiments both the subscriber TD 110 and the third party TD 120 may be SLS enabled.

As shown in the FIG. 2 illustration, an SLS platform 115 may be connected to the subscriber TD 110 via a first provider network 201 and to the third party TD 120 via a second provider network 202, although it is envisioned that TDs 110 and 120 may be associated with a common service provider. Moreover, it is envisioned that either, or both, service providers respectively associated with provider networks 201, 202 may function as both a primary service provider and an SLS provider for a given TD 110, 120. Further, it is envisioned that either or both of TD 110 and TD 120 may be associated with a primary service provider and a separate SLS provider.

For exemplary purposes the subscriber TD 110 is depicted as being SLS enabled and the third party TD 120 is depicted as not having a second line service associated with it. Other combinations of primary and second line service providers for each of TDs 110 and 120 are envisioned. In the FIG. 2 illustration, it can be seen that the SLS platform 115 may include an SLS server 205 configured to receive calls directed to and from a second line number associated with subscriber TD 110.

As illustrated in FIG. 2, the SLS server 205 includes a processor 209 and a memory 211 coupled to the processor 209. The memory 211 may include instructions for executing one or more of the method steps described herein. Further, the processor 209 and the memory 211 may serve as a means for executing one or more of the method steps described herein. As indicated, the memory 211 may also include a redirection module 117 and a central SLS database 116. Notably, it should be understood that the term server 205 may refer to a single server system or multiple systems or multiple servers. One of ordinary skill in the art will appreciate that the various server arrangements may be selected depending upon computer architecture design constraints and without departing from the scope of the invention.

As further illustrated in FIG. 2, the subscriber TD 110 may include a processor 208 and a memory 207 coupled to the processor 208. The memory 207 may include instructions for executing one or more of the method steps described herein. Further, the processor 208 and the memory 207 may serve as a means for executing one or more of the method steps described herein. As indicated, the memory 207 may also include an SLS module 105 and a local SLS database 106.

Figure 3A:
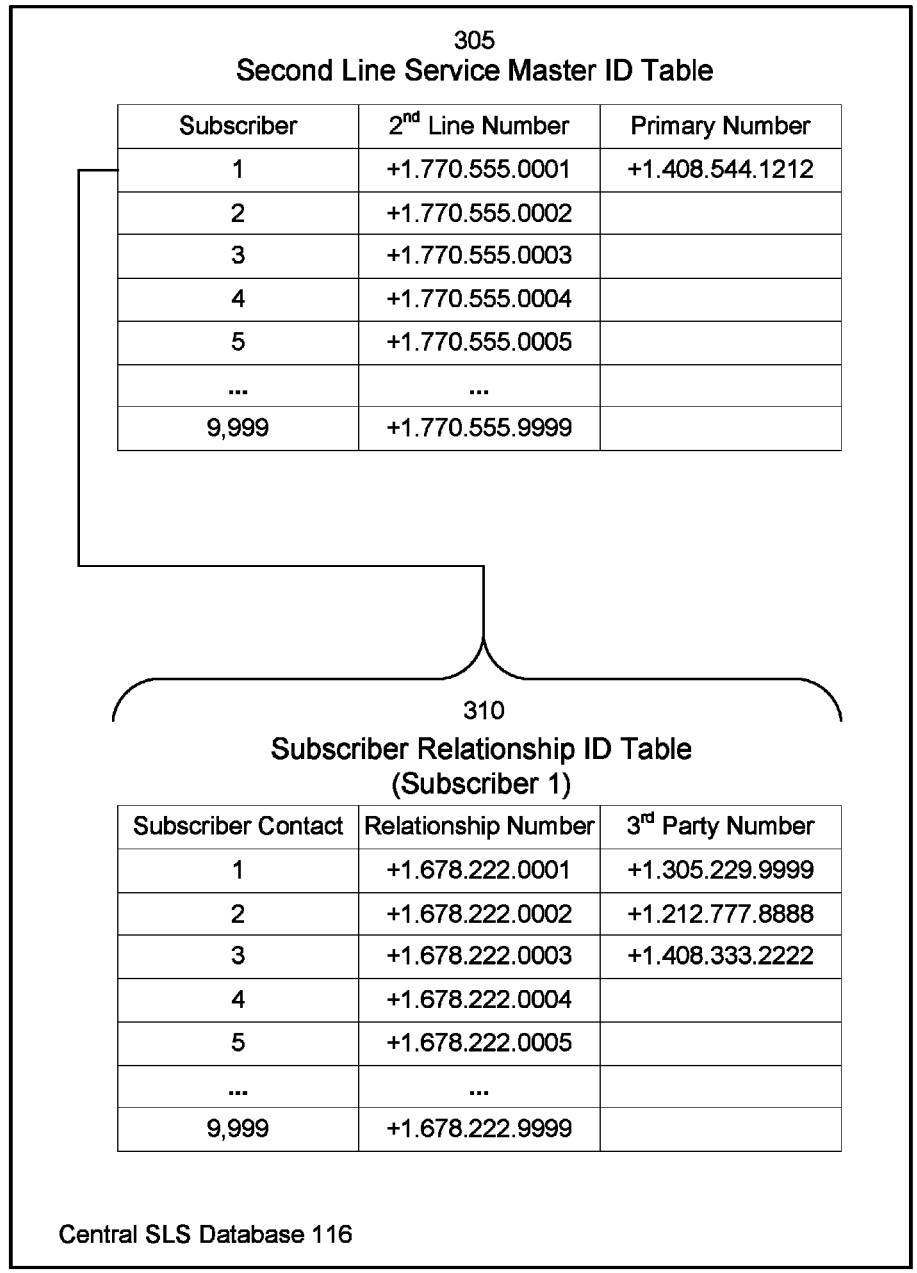

Referring to FIGS. 3A-3B, illustrated are exemplary data tables that may be leveraged by a redirection module 117 of an SLS platform 115 and an SLS module 105 of a subscriber TD 110 to provide a second line service to a user of a subscriber TD 110. The Second Line Service Master ID Table 305 and Subscriber Relationship ID Table 310 of FIG. 3A may be stored in a central SLS database 116 while the exemplary Subscriber Relationship ID Table 315 of FIG. 3B may be stored in a local SLS database 106. An illustrative embodiment of a method for providing a second line service will now be described in the context of the exemplary data tables reflected in FIGS. 3A-3B.

Embodiments of the method for providing a second line service leverage intermediate phone numbers to ensure that calls meant for the user of subscriber TD 110 route to the SLS platform 115. Once the call reaches the SLS platform 115, an application running on redirection module 117 makes a translation to complete the call. The SLS platform 115 maintains a master list of SLS phone numbers that are in service. In some embodiments, these numbers may be owned by the SLS service provider. In the telecommunications network 125, these numbers route to the SLS platform 115 (i.e., the SLS platform may exist in network 125 as a telephony peripheral).

The SLS service provider that manages the SLS platform 115 essentially has a group of SLS numbers that are his inventory and are provided to subscribers of the SLS service. Regarding the SLS numbers which are the inventory of the SLS service provider, one of ordinary skill in the art will recognize that the SLS numbers may be random and generally unrelated to each other, i.e. although the exemplary SLS numbers depicted in the FIG. 3A Second Line Service Master ID Table are sequential it is envisioned that such is not the case in all embodiments. Referring to the Second Line Service Master ID Table 305, the example subscriber #1 has been issued SLS number 1.770.555.0001. As such, subscriber #1 may choose to use his SLS number as a business number and give it out to contacts. Notably, in Second Line Service Master ID Table 305 the primary number, 1.408.544.1212, that is assigned to the subscriber TD 110 by the primary service provider 201 is associated with subscriber #1 and his SLS number 1.770.555.0001.

For each subscriber to the SLS service, a Subscriber Relationship ID Table 310 is also maintained. Referring to the Subscriber Relationship ID Table 310, it can be seen that the SLS service provider has another list of dialable phone numbers, i.e. relationship numbers, which are maintained. These relationship numbers are essentially "hidden numbers" that are used to facilitate calls between the subscriber's TD 110 (which, again, is actually a TD with a number and service provided by a primary service provider, such as primary service provider 201) and the SLS platform 115 operated by the SLS service provider.

Concerning the Subscriber Relationship ID Table 310, one of ordinary skill in the art will understand that certain embodiments may not formally distinguish one subscriber's records from that of another via individual subscriber relationship ID tables. Rather, as is understood in the art of database management and query, a more general relational database including records associated with multiple subscribers may be used to map subscriber number and third party number combinations to given relationship numbers. As such, it will be understood that the description in this disclosure of exemplary embodiments that include individual subscriber relationship ID tables are offered for illustrative purposes only and will not limit the scope of the disclosure.

Additionally, concerning the use of relationship numbers, it is envisioned that certain relationship numbers may be used for a plurality of subscriber number and third party number combinations, i.e. in certain embodiments a given relationship number may not be unique to a given subscriber number and third party number combination. For example, in an illustrative embodiment, subscribers D, E, F and G, may all have database records that map relationship number X to third party numbers J, K, L and E, respectively. Notably, in this exemplary scenario, the last subscriber number and third party number combination (G:E) is meant to envision a case where G has a calling relationship with E. In such case, although E is a subscriber to the SLS service he may also be treated as a third party caller relative to subscriber G. To carry the example further, if G has a relationship with E, E also has one with G. However, the E:G combination may or may not use a different relationship number Y.

Additionally, it is envisioned that in certain embodiments a relationship number may be used for purposes other than to map a third party calling number in Subscriber Relationship ID Table 310. For example, a given relationship number may be used by the SLS platform 115 to alert the SLS Module 105 that a call has been received from an unknown caller with a blocked CLID. Or, as another non-limiting example, a given relationship may be used by the SLS platform 115 to alert the SLS Module 105 that a voice message has been deposited for the subscriber.

Returning to the FIG. 3A illustrations, as mentioned above, the relationship numbers are "behind the scenes" numbers that are hidden from the subscriber. This is accomplished by an app running on SLS module 105 residing on subscriber TD 110. As will be explained in more detail, the SLS module 105 leverages the app to translate any number calling the subscriber, or called by the subscriber, into the appropriate Relationship Number. The application run by the SLS module 105 on subscriber TD 110 uses a relationship number to access the SLS platform 115 over the telephone network 125. The SLS number is used by the redirection module 117 of the SLS platform 115 to complete calls with any external party calling the subscriber's SLS number or being called by the SLS subscriber using SLS module 105 of subscriber TD 110. Essentially, by leveraging the relationship numbers, an SLS service provider may insert itself into the middle of a call between a third party TD 120 and a subscriber TD 110 which have primary services provided by different service providers 202 and 201, respectively.

For example, referring back to the tables in FIG. 3A and the system architectures described in FIGS. 1-2, Subscriber #1 associated with subscriber TD 110 already has mobile phone service via primary service provider 201 using mobile phone number 1.408.544.1212. Subscriber #1 subsequently subscribes to an SLS service provided by way of SLS platform 115 and is assigned SLS number (i.e., a second line number) 1.770.555.0001 (again, the SLS provider and the primary service provider 201 may be one and the same provider in some embodiments but, in the present example they are separate providers). It will also be appreciated that the assigned SLS number may also be any other number that is associated with the subscriber but that the subscriber has decided to port over or to utilize from the SLS 115 platform, either permanently or temporarily. The relationship between the subscriber's primary number and the SLS number is reflected in Second Line Service Master ID Table 305 of FIG. 3A. 1.770.555.0001, for example, may be the phone number that subscriber #1 publishes for his side business, personal calls, etc.

A third party, identified in Subscriber Relationship ID Table 310 of FIG. 3A as being Subscriber Contact #1, is associated with a third party TD 120A having a primary phone number 1.305.229.9999. The service associated with the third party's TD 120 and primary phone number 1.305.229.9999 may be provided by service provider 202. Notably, although the primary phone number 1.305.229.9999 associated with third party TD 120 is described herein as a primary phone number, it will be understood that it may, in fact, be a second line number in embodiments where the third party is also an SLS subscriber. In such event, the steps taken by the SLS platform 115 in the context of receiving a call to or from the $3^{rd}$ party number may not change. Further, as one of ordinary skill in the art understands, as with any phone service, a called party can receive calls over the telephone network 125 from a telecommunications device on any service provider's network.

Returning to the example, the third party uses TD 120A to place a call to the subscriber #1 SLS number 1.770.555.0001. As described above, the call is routed to the SLS platform 115. The SLS platform 115 accepts the call (without connecting the voice path to the third party TD 120A) and determines that the call is for SLS number 1.770.555.0001 and that 1.770.555.0001 does not yet have a "relationship" set up for the calling number, 1.305.229.9999 (for purposes of this example, subscriber #1 has only recently subscribed to the SLS service and Subscriber Relationship ID Table 310 does not yet contain any records—i.e., the third party associated with TD 120A is the first to place a call to the SLS number of subscriber #1).

The SLS platform 115 creates the following relationship in Subscriber Relationship ID Table 310: When 1.770.555.0001 receives (or places) a call from/to 1.305.229.9999, the interaction with the subscriber's phone (1.408.544.1212) will use dialable telephone number 1.678.222.0001. Notably, it is envisioned that a given relationship number, such as relationship number 1.678.222.0001 in the present example, may be used as a relationship number for many different SLS subscribers as it is the combination of the subscriber's primary number and/or the SLS number and the relationship number that map to the external number (in this case, 1.305.229.2999).

Returning to the example, now that the relationship number 1.678.222.0001 has been established in connection with subscriber #1 and the calling third party, the SLS platform 115 may proceed to establish the second half of the call—the call from the SLS platform 115 to the subscriber's TD 110. The SLS platform 115 places the call to the primary number 1.408.544.1212 that points to subscriber TD 110 per its primary service provider 201.

The calling party field of the call placed from SLS platform 115 to subscriber TD 110 may contain a specially encoded message for the SLS phone app running on SLS module 105. In some embodiments, the calling party field may contain the relationship number established by the SLS platform 115 (in this example, 1.678.222.0001) and the actual primary number of the calling third party (in this example, 1.305.229.9999), separated by a dialable separator such as a "star" character. In other embodiments, the calling party field may be populated with "unknown caller" or the like in the event that the relationship number is a new number assigned by the SLS platform 115 and not yet recognized by the SLS phone app (more details regarding such an embodiment is described below relative to FIGS. 4 and 7). Notably, it is envisioned that other embodiments may populate the calling party field, or provide other metadata, that serves to trigger recognition of the incoming call as a call directed to the SLS number of the subscriber. As such, by describing the exemplary embodiment to populate the calling party field with a combination of the relationship number and the third party's actual phone number, the scope of the disclosure will not be limited.

Returning to the example, having recognized that the incoming call is from the SLS platform 115, the SLS module 105 stores the combination of the relationship number 1.678.222.0001 and third party actual number 1.305.229.9999 in the local SLS database 106. To complete the exemplary call, the SLS module 105 may cause the actual phone number associated with the third party TD 120A, 1.305.229.9999, to be rendered on display component 103 as an identification of the calling party and rings the phone. Once the subscriber #1 answers, the SLS platform 115 connects the two legs of the call (leg 1 represented by third party TD 120A to SLS platform 115 and leg 2 represented by SLS platform 115 to subscriber TD 110) by methods known and understood by those of ordinary skill in the art of telecommunications. As non-limiting examples, the calls can be connected via a forward or a bridge, as well as other technologies.

Notably, in the example, the combination of the relationship number 1.678.222.0001 and the third party actual calling number 1.305.229.9999 is now stored in the central SLS database 116 at SLS platform 115 and also in the local SLS database 106 in subscriber TD 110. As one of ordinary skill in the art will recognize, the importance of the relationship number is that it may also provide a mechanism by which the SLS platform may intercept calls originating from subscriber TD 110 via SLS number.

Furthering the example, Subscriber #1 desires to originate a call to the third party associated with 1.305.229.9999 from his SLS number 1.770.555.0001. Because the third party associated with 1.305.229.9999 had previously placed a call to the SLS number 1.770.555.0001, the relationship combination that maps Subscriber #1's SLS number 1.770.555.0001 and the third party phone number 1.305.229.9999 to relationship number 1.678.222.0001 is already stored in both the central SLS database 116 at SLS Platform 115 and the local SLS database 106 in subscriber TD 110.

To place calls from his SLS number, Subscriber #1 uses the SLS phone app of SLS module 105 as his dialer, as a non-limiting example of one potential embodiment. In the SLS dialer (not depicted in the Figures), Subscriber #1 dials the third party number 1.305.229.9999 which is reflected in the Private Relationship ID Tables 310, 315 as being associated with his Contact #1. The SLS module 105 queries Subscriber Relationship ID Table 315 in local SLS database 106 and translates the called third party number 1.305.229.9999 to relationship number 1.678.222.0001. The SLS module 105 may indicate to the subscriber via display 103 that it is calling 1.305.229.9999, but instead it calls the relationship number 1.678.222.0001. By calling the relationship number associated with Contact #1, the network 125 routes the call to the SLS platform 115 instead of directly to third party TD 120A phone. The SLS platform 115 may also modify the "calling number" field in the signaling, that is instead of populating the field with the actual number of the calling device (1.408.544.1212), it may populate it with the SLS number (1.770.555.0001). In this way, it will appear to Contact #1 that he is receiving a call originating from the SLS number of the subscriber instead of the primary number (1.408.544.1212) associated with subscriber TD 110.

When the SLS platform 115 processes this first leg of the call, it may recognize that the calling number is the subscriber's primary number 1.408.544.1212 (which is associated with the subscriber's SLS number 1.770.555.0001) and the called number is the relationship number 1.678.222.0001. Querying the Subscriber Relationship ID Table 310 in central SLS database 116, the redirection module 117 may apply the following logic: "when primary number 1.408.544.1212 calls relationship number 1.678.222.0001, it is actually SLS number 770.555.0001 calling 1.305.229.9999." The SLS platform 115 may then follow that logic and complete the subscriber's call by calling the actual number 1.305.229.9999 associated with third party TD 120A. Notably, in completing the second leg of the call from Subscriber #1 to the third party associated with third party TD 120A, the SLS platform 115 may cause the calling number to be reflected as the SLS number 1.770.555.0001 instead of the actual primary number of subscriber TD 110.

As described above, it is envisioned that another SLS subscriber (for example, Subscriber #2 having SLS number 1.770.555.0002) could also call use the same relationship number (1.678.222.0001), but it would map to a different external number associated with a contact of Subscriber #2. The encoded representation of the actual called number may be a combination of the SLS number and the relationship number.

FIGS. 4A-4D collectively illustrate an exemplary method 400 for routing calls between a third party telecommunications device, such as third party TD 120, and a telecommunications device associated with a subscriber to a second line service, such as subscriber device 110. At block 402, a communication is directed to and received by an SLS platform 115. Notably, the communication is envisioned to be any communication over network 125 that is directed to SLS platform 115, whether such communication originates from a TD 110 or a TD 120. Next, at decision block 404, the SLS platform 115 determines whether the communication was a call that originated from a third party seeking to connect to a subscriber's device, i.e. whether a third party has dialed an SLS number associated with an active subscriber to the SLS service provided by SLS platform 115. If the communication was not a call that originated from a third party, then the "no" branch is followed to block 432 of FIG. 4C. If the communication was a call that did, in fact, originate from a third party, then the "yes" branch is followed to block 406. Notably, if a communication is directed to the SLS platform 115, one of ordinary skill in the art will recognize that the communication was either a call to an SLS number of a subscriber (if dialed by a third party), a call to a relationship number (if originating from an SLS client of a subscriber TD 110), or a data communication originating from an SLS client application.

At block 406, the SLS platform 115 queries central SLS database 116 for the calling line ID ("CLID"), i.e. the phone number of the calling party, in association with the SLS number that caused the call to be routed to the SLS platform 115. If at decision block 408, the SLS platform 115 successfully queries the calling party CLID and SLS number combination, then the "yes" branch is followed to block 422 of FIG. 4B. If the calling party CLID and SLS number combination are not successfully queried, then the "no" branch is followed to block 410.

At block 410, the SLS platform 115 may associate a new relationship number with the calling third party number and the subscriber's primary number and SLS number. At block 412, the central SLS database 116 is updated to include the newly created record—the calling third party is listed as a contact of the subscriber in the Subscriber Relationship ID Table 310. At block 414, the call is redirected to the subscriber's primary number, thereby routing it to the subscriber TD 110. In redirecting the call, the calling party field may be populated in some embodiments with a combination of the newly assigned relationship number and the third party CLID.

At block 416, the subscriber TD 110 may receive the redirected call via SLS module 105 and the local SLS database 106 updated to include the newly assigned relationship number in association with the third party CLID. At block 418, the third party CLID is displayed to the subscriber and the subscriber is alerted to the incoming call. Notably, it is envisioned that displaying the CLID may include rendering the CLID itself, rendering a picture of the third party, rendering a name, etc. as is understood by those with skill in the art of graphical user displays and interfaces. At block 420, the call is connected by the SLS platform 115 when the subscriber answers the call with his subscriber TD 110.

It is envisioned that the steps taken at block 414 of the method 400 may differ in some embodiments. For instance, when a third party call to a subscriber SLS number is received at the SLS platform 115, and the third party calling number is not yet associated with a relationship number, the SLS platform 115 may assign a next relationship number as described relative to blocks 410-412 then redirect the call to the subscriber TD 110. The SLS module 105 of the subscriber TD 110, having no record of the new relationship number in its local database 106, may display the calling number as "unknown caller" on the display of the subscriber TD 110. At the same time, the SLS module 105 may establish a data connection over network 125 with the SLS platform 115 for the purpose of acquiring the third party calling number associated with the new relationship number. Once the actual third party calling number is acquired, the SLS module 105 may update the local database 106 and change the display from "unknown caller" to the actual third party calling number.

Figure 4A:
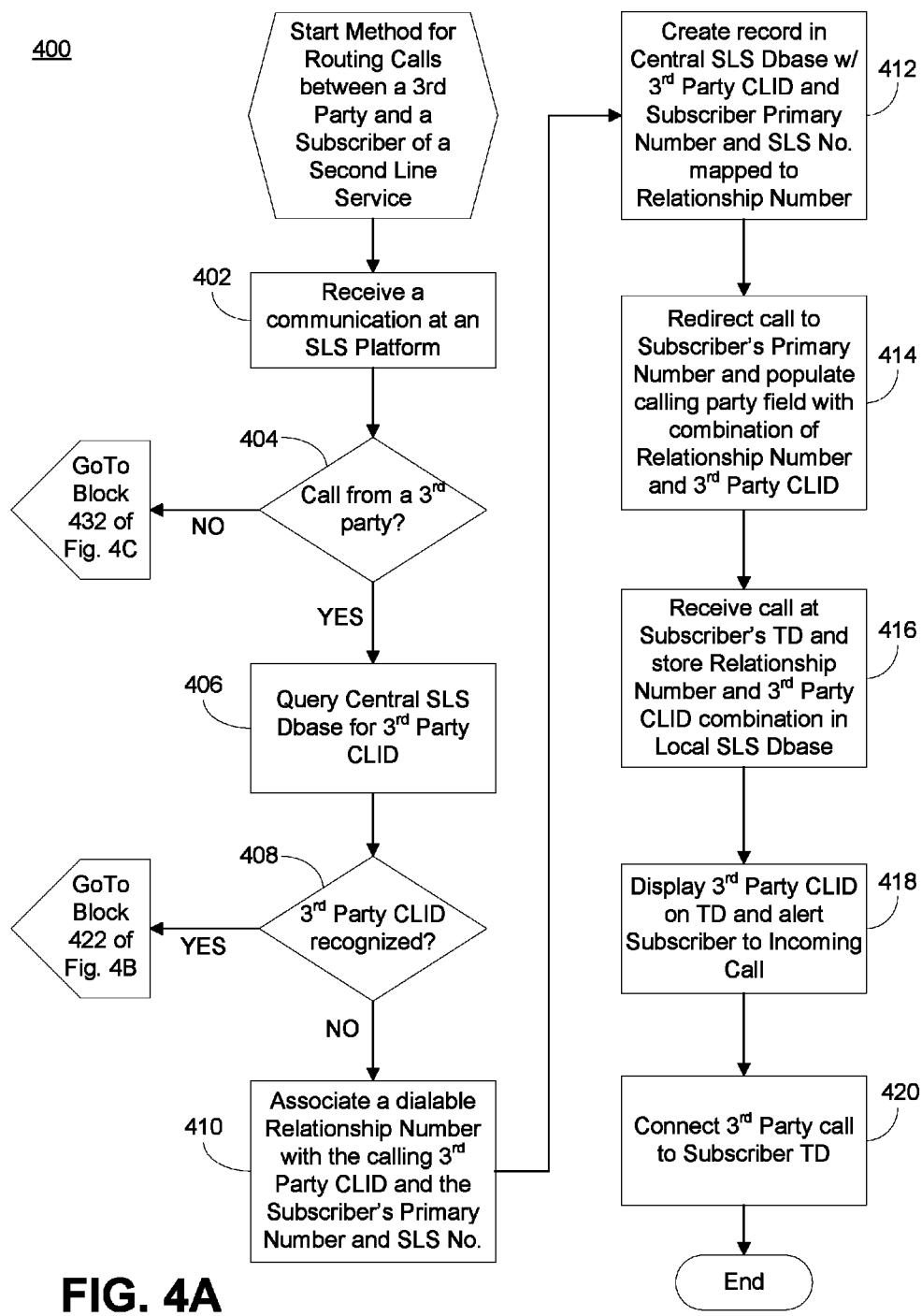
FIGS. 4A-4D collectively illustrate an exemplary method for routing calls between a third party TD and a subscriber TD.
Figure 4B:
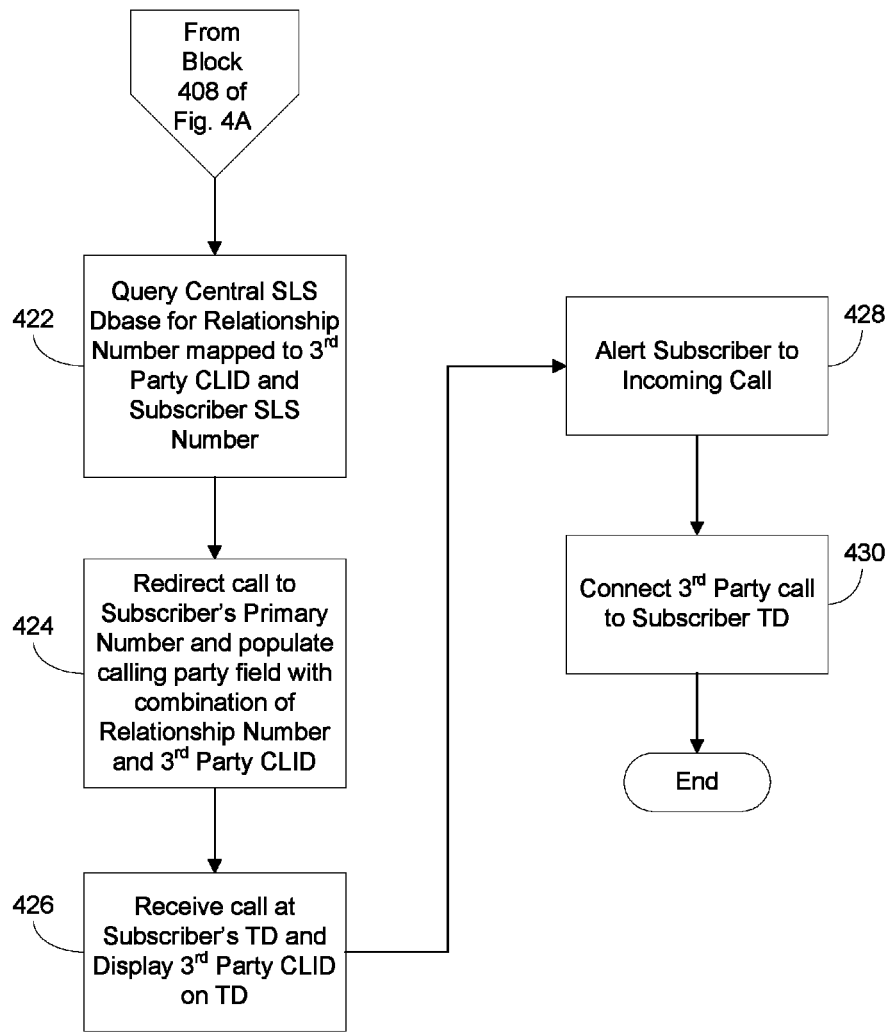

Turning now to FIG. 4B, if the "yes" branch is followed from decision block 408 of FIG. 4A, at block 422 the SLS platform 115 queries the central SLS database 116 for the relationship number that maps to the combination of the third party CLID and subscriber's SLS number. At block 424, the subscriber's primary number, as also identified from the query of block 422, is called by the SLS platform 115. At block 426, the call is received at the subscriber's TD 110 and the SLS module 105 recognizes that it originated from the SLS platform 115. It is envisioned that some embodiments of a SLS module 105 may recognize that an incoming call is from the SLS platform 115 by virtue of the call originating from a relationship number. At block 426, the relationship number in the calling party field of the call signaling causes the SLS module 105 to handle the call and display the associated third party CLID for the benefit of the subscriber (the third party CLID may be queried from the local SLS database 106 by use of the relationship number).

At block 428 the subscriber is alerted to the incoming call and at block 430 the call is connected to the subscriber TD 110 by the SLS platform 115 when the subscriber answers the call. It is envisioned that, if the subscriber elects not to answer a call to the SLS number, the SLS module 105 in some embodiments may use a voicemail service or message service in response to the unanswered call. That is, it is envisioned that an SLS service may provide features and services dedicated to the SLS subscriber and separate from similar features and services associated with the subscriber's primary number.

Figure 4C:
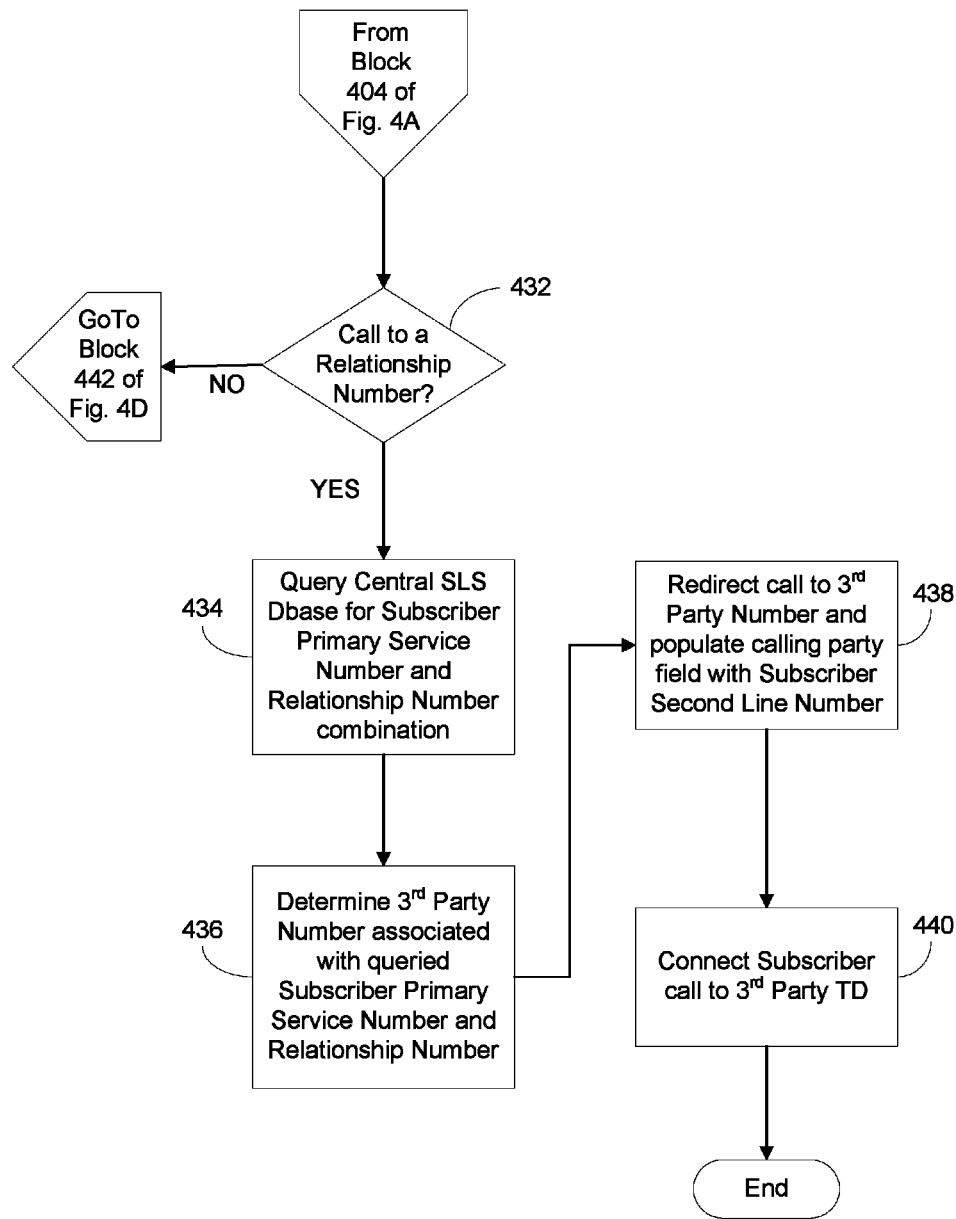

Turning now to FIG. 4C, if the "no" branch is followed from block 404 of FIG. 4A, at decision block 432 the SLS platform 115 determines that the communication is a call that was directed to a relationship number. Notably, if the call is directed to a relationship number, then it must have originated from a TD 110 associated with a subscriber of the SLS service. If the communication was not a call directed to a relationship number, the "no" branch is followed to block 442 of FIG. 4D. If, however, the communication was a call that was routed to the SLS platform 115 because it was directed to a relationship number then the "yes" branch is followed to block 434.

At block 434, the central SLS database 116 is queried for the relationship number in combination with the subscriber's primary number from which the call originated. At block 436, the SLS platform 115 may determine the actual third party number with which the relationship number and the subscriber primary number combination is associated. Having identified the actual third party number, the SLS redirection module 117 may deduce that the subscriber desires to contact the third party TD 120 associated with that actual third party number and, at block 438, the SLS platform 115 redirects the call to such TD 120. The calling party field of the call is populated with the subscriber's SLS number so that the third party will associate the incoming call with the second line number of the subscriber and not the primary number of the subscriber. At block 440, the call is connected to the third party TD 120.

Figure 4D:
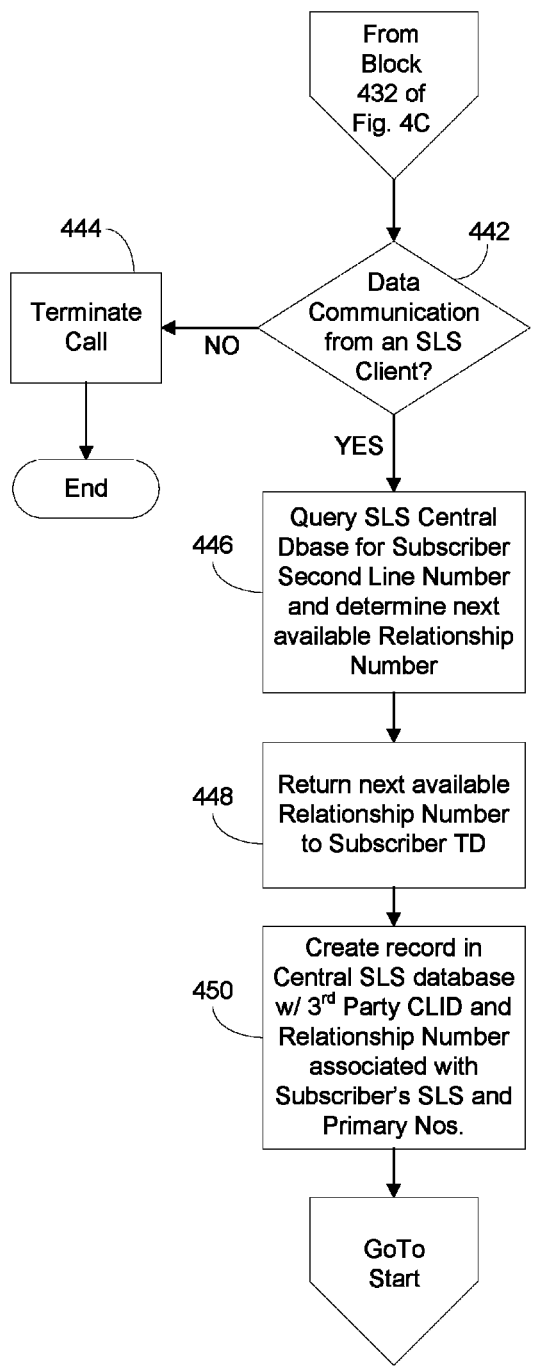

Turning now to FIG. 4D, if the "no" branch is followed from block 432 of FIG. 4C, at decision block 442 the SLS platform 115 determines that the communication is a data communication over network 125 that originated from an SLS client of a subscriber TD. If not, then it is assumed that it was an errant communication and the "no" branch is followed to block 444 and the communication is disconnected. If the communication did originate from a second line client (i.e., an SLS module 105 in a subscriber TD 110) associated with a subscriber to the SLS service, then the "yes" branch is followed to block 446. It is envisioned that the communication from an SLS client application to an SLS platform may be of any protocol suitable for communicating over network 125. At block 446, it is deduced by the SLS platform 115 that the subscriber associated with the calling SLS client desires to use the SLS service to call a third party with which no relationship number has been associated with the actual third party number. The SLS module 105 has provided the request for the new relationship number, along with the third party number it desires to call, to the SLS platform 115 via the communication. The central SLS database 116 is queried at block 446 to determine the next available relationship number for the subscriber's given SLS number.

It is envisioned that the SLS module 105 may communicate with the SLS platform 115 in some embodiments to obtain a relationship number for a third party that has not previously been called via a session-based protocol such as, but not limited to, an unstructured supplementary services data ("USSD") protocol. As is understood in the art of telecommunications protocols, a gateway such as a USSD gateway may be used to route messages from a signaling network to service applications and back. In this way, certain embodiments of an SLS module 105 may communicate with an SLS platform 115 to designate and acquire a relationship number to a third party who has not been called by the subscriber before via the SLS service (or, for that matter, a third party who has not placed a call to the subscriber's second line number before).

Moreover, USSD is offered herein for exemplary purposes and is not meant to limit the type of communications protocol that may be used by certain embodiments. For example, it is envisioned that short message service ("SMS") protocol, multimedia messaging service ("MMS") protocol, and/or other protocols may be used by some embodiments. It is envisioned that an IP-based interaction over the TD's data service may be used by some embodiments. As would be recognized by one of ordinary skill in the art, use of session based protocols or other communication protocols may minimize temporal delays in allocating and acquiring relationship numbers between an SLS module 105 and an SLS platform 115. In fact, it is anticipated that any mechanism that can be used to establish a communication path between the SLS module 105 and the SLS platform 115 for the purposes of supporting the SLS service can be utilized. This may include any of the varieties of cellular data, WiFi, Bluetooth technologies, proprietary wireless or wired technologies, etc. Such channels can be used in setting up the relationship databases, sharing information between the SLS module 105 and the SLS platform 115, initiating voice communication establishment from the TD 110 to the SLS platform 115, the TD 110 requesting the SLS platform 115 to place a call to a third party TD 120, etc.

At block 448, the determined next available relationship number is returned to the SLS module 105 of the subscriber TD 110. At block 450, the central SLS database 116 is updated with the new relationship number and the third party CLID provided to the SLS platform by the SLS client 105 of the subscriber TD 110. The new relationship number is now associated in the central SLS database 116 with the subscriber primary number, the subscriber SLS number and the third party CLID. Notably, after blocks 448 and/or 450, the method 400 may return to the start of method 400 at block 402 as the SLS module 105 of the subscriber TD 110 has acquired a new relationship number in association with a third party CLID. Consequently, using the newly acquired relationship number may essentially start over the method 400 with the SLS platform receiving a communication. If so, the method 400 would follow to FIG. 4C where the communication was recognized as the subscriber TD 110 having placed a call to the new relationship number.

Figure 5:
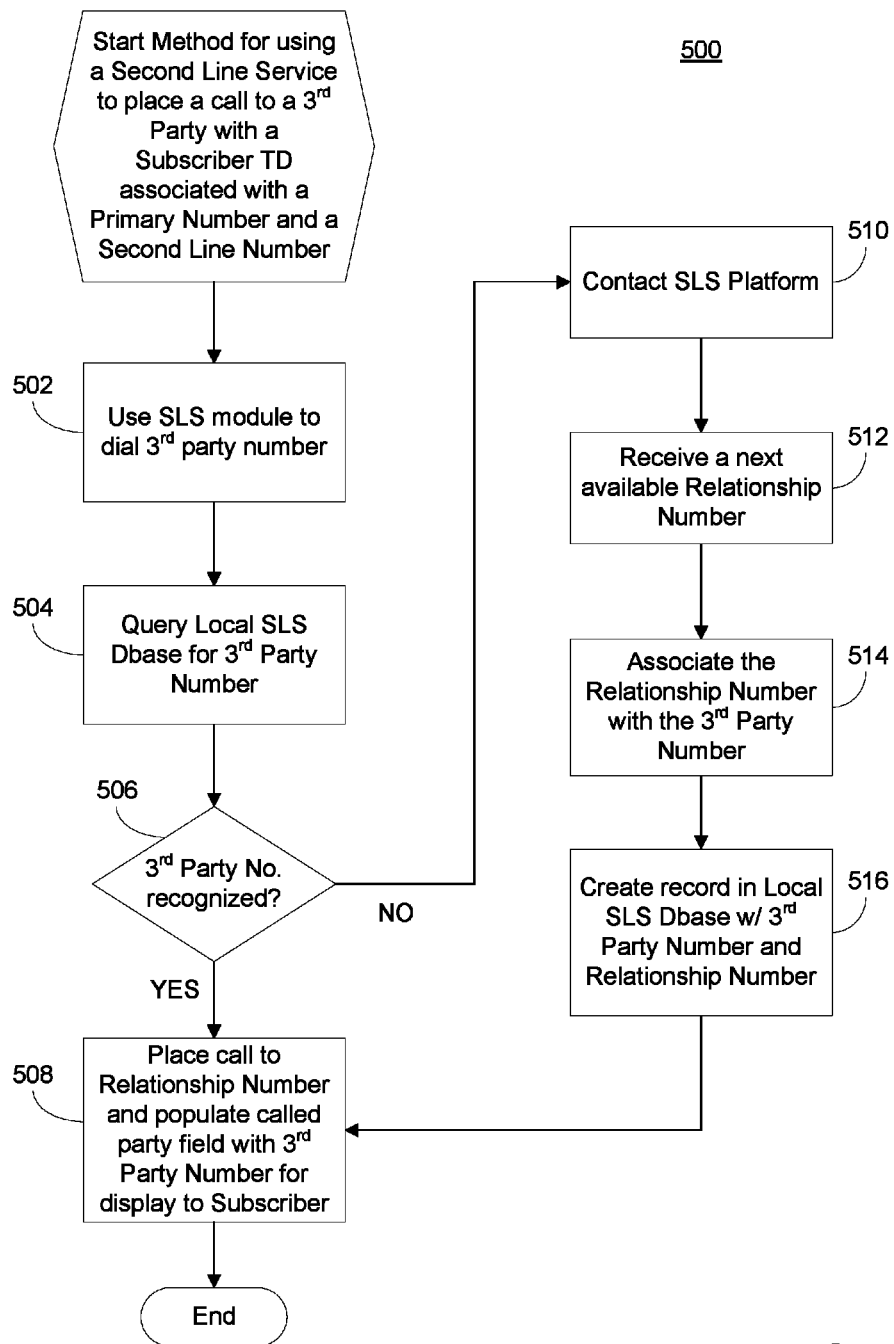
FIG. 5 illustrates an exemplary method for routing calls from a subscriber TD associated with a primary number and a second line number to a third party TD.

FIG. 5 illustrates an exemplary method 500 for routing calls from a telecommunications device associated with a primary number and a second line number, such as subscriber device 110, to a third party telecommunications device, such as third party TD 120A. At block 502, the SLS module 105 is used by the user of subscriber TD 110 to dial the phone number of a third party associated with third party TD 120A. The SLS module 105 queries local SLS database 106 for the dialed third party number. If the third party number is recognized in the query, at decision block 506, the "yes" branch is followed to block 508 and a call is placed to the relationship number associated with the third party number and reflected in the queried record. Further, at block 508, when the relationship number is called (thus routing the call to the SLS platform for eventual connection to the third party TD 120A). In some embodiments, the called party field is populated with the third party number and rendered on the display component 103 of the subscriber TD 110 for the benefit of the subscriber.

If the third party number is not recognized at decision block 506, then the "no" branch is followed to block 510. At block 510, the SLS platform 115 is contacted and at block 512 a next available relationship number is provided back to the SLS module 105. At blocks 514 and 516, the SLS module 105 updates the local SLS database 106 with the relationship number in combination with the associated third party number. The call is completed at block 508 by using the relationship number as previously described.

Figure 6:
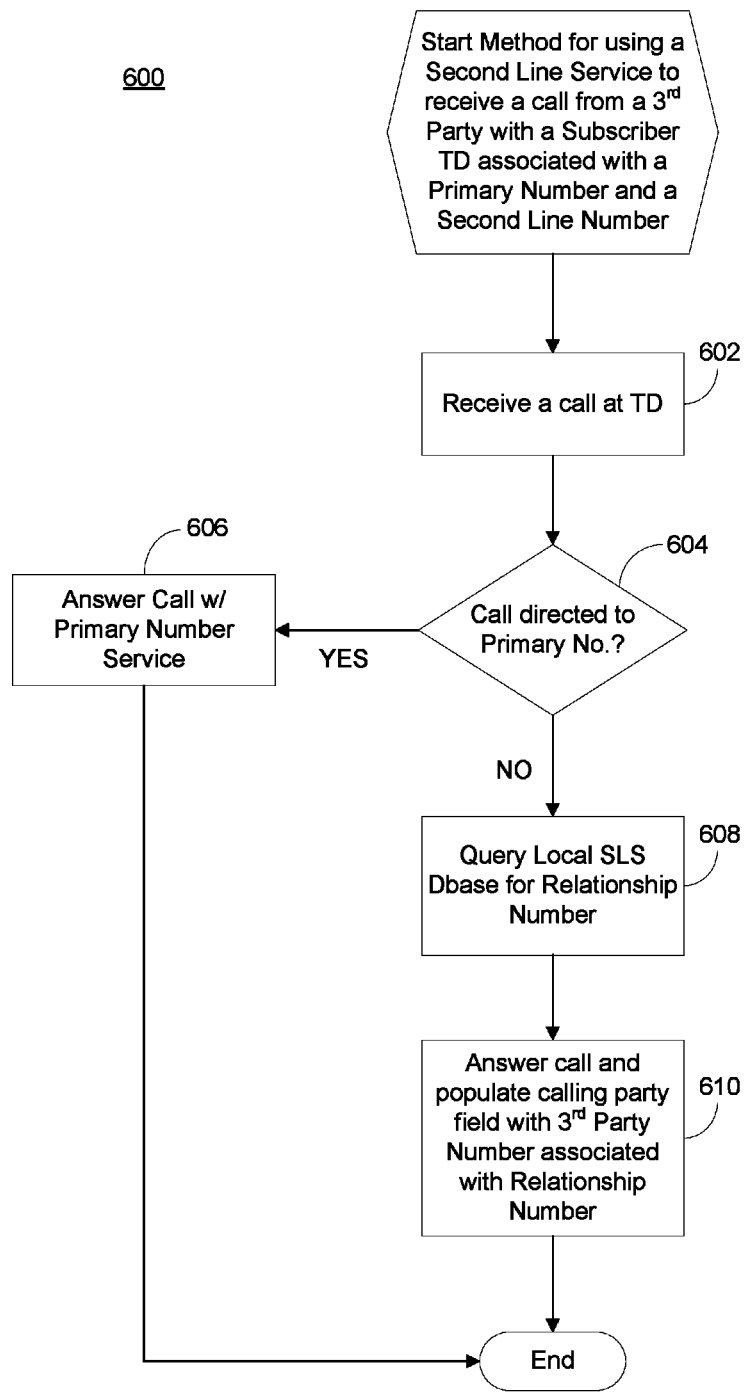
FIG. 6 illustrates an exemplary method for routing calls from a third party TD to a subscriber TD associated with a primary number and a second line number.

FIG. 6 illustrates an exemplary method 600 for routing calls from a third party telecommunications device, such as third party TD 120A, to a telecommunications device associated with a primary number and a second line number, such as subscriber device 110. Beginning at block 602, an incoming call from a third party TD 120A is received at a subscriber TD 110. At decision block 604, the SLS module 105 determines whether the call was directed to the primary number associated with the TD 110 or the SLS number associated with the subscriber TD 110. If the call was directed to the primary number, then the "yes" branch is followed to block 606 and the call is answered in association with the features and services of the primary number. If the call was directed to the SLS number associated with the subscriber TD 110 then the "no" branch is followed block 608. As described above, the SLS module 105 may be able to determine that the call was directed to the SLS number by virtue of the call originating from a relationship number. Recognizing the CLID as a relationship number, the SLS module 105 may determine that the call is meant for the second line service, as opposed to the primary service of the TD 110. Moreover, as described above, the SLS module 105 may recognize that the incoming call is from a relationship number even if the relationship number is not yet included in database 106.

At block 608, the SLS module 105 queries local SLS database 106 to find the relationship number associated with the incoming call. If the relationship number is not identifiable in the database 106, the SLS module 105 may communicate with the SLS platform to acquire the third party calling number that has been associated with the new relationship number in the central database 116 by the SLS platform. Subsequently, the SLS module 105 may update the local database 106 to include the new relationship number in combination with the third party number. At block 610, the call is answered with the features and services associated with the second line service and the called party field on the display 103 used by SLS module 105 is populated with the third party CLID for the benefit of the subscriber. Notably, as described above, if the relationship number is a new number to the SLS module 105, the called party field may be temporarily populated with "unknown caller" or the like until the actual third part calling number is determined.

Turning now to FIG. 7, an embodiment of a second line service method that uses a session initiated protocol ("SIP") and/or customized applications for mobile networks enhanced logic (CAMEL) for a call placed through an SLS service is described. As one of ordinary skill in the art would recognize, CAMEL Application Part (CAP) is a user protocol that rides on top of the Transaction Capabilities Application Part ("TCAP") of the SS7 protocol suite. Embodiments of a system and method for second line services may use combinations of SIP, CAP and ISUP to connect calls between calling and called parties on a mobile device network.

In the particular calling scenarios applicable to the FIG. 4 method, the primary service provider of the SLS subscriber may exact a charge (i.e., generate an invoice or a bill) for call placed from the subscriber's device (such as TD 110) to the SLS platform 115. Subsequently, the SLS provider associated with the SLS platform 115 may also exact a charge for the call placed from the platform to the called party (such as third party TD 120). It is envisioned that this potential for "dual billing" in embodiments described relative to the FIG. 4 method may be cumbersome and less than optimal for at least the reasons that the call records and primary service invoices may identify a call between the subscriber's TD 110 and the SLS platform 115 as being a call to/from an otherwise hidden Relationship Number. Consequently, the dual billing reality of certain embodiments may present a level of inconvenience or even confusion to the SLS subscriber.

Accordingly, it is envisioned that some embodiments of a second line service may include an SLS module 105 configured to either access a separate SIP calling program or use an integrated SIP calling capability. As such, the SLS module 105 may place the initial call to the SLS platform 115 over a data channel of communications network 125, as would be understood by one of ordinary skill in the art. Advantageously, by using SIP in such embodiments a voice channel call otherwise generated, reported and billed by the primary service provider in association with a primary phone number of the TD may be avoided. As such, for embodiments of a second line service method that uses SIP for certain legs of the communications between a TD and an SLS platform, it is envisioned that:

1) Billing and/or reporting a call between the primary number of the subscriber's mobile device and a relationship number on the SLS platform by the primary service provider supplying the primary phone number of the subscriber's TD may be avoided;
2) Because billing and/or reporting by the primary service provider is avoided regarding a call between the primary number of the subscriber's mobile device and a relationship number on the SLS platform, the subscriber may not see and be confused by a call listed on his primary phone number invoice as being placed to an otherwise hidden relationship number instead of to the recognizable third party number he actually dialed;
3) Any revenue to the primary service provider may be limited to usage against the subscriber's primary phone number data plan (or overage in the primary number data plan); and
4) The SLS provider may be positioned to exact and collect all revenue associated with a call placed through the SLS service which may be invoiced to the subscriber as a call placed from the subscriber's SLS number.

A first exemplary scenario in which it is envisioned that an embodiment of a second line service method may use a SIP enabled communication leg over network 125 for the benefit of a subscriber includes a call:
Placed from: A calling TD having an SLS service;
Directed to: A called TD having an SLS service provider that is different from its primary service provider;
The call between the SLS platform and the called TD may be a SIP call made via a data service provided to the called TD from its primary service provider.

A second exemplary scenario in which it is envisioned that an embodiment of a second line service method may use a SIP enabled communication leg over network 125 for the benefit of a subscriber includes a call:
Placed from: A calling TD having an SLS service provider that is different from its primary service provider;
Directed to: A called TD having an SLS service;
The call between the calling TD and the SLS platform may be a SIP call made via a data service provided to the calling TD from its primary service provider.

A third exemplary scenario in which it is envisioned that an embodiment of a second line service method may use a SIP enabled communication leg over network 125 for the benefit of a subscriber includes a call:
Placed from: A calling TD having only a primary service provider;
Directed to: A called TD having an SLS service provider that is different from its primary service provider;
The call between the SLS platform and the called TD may be a SIP call made via a data service provided to the called TD from its primary service provider.

A fourth exemplary scenario in which it is envisioned that an embodiment of a second line service method may use a SIP enabled communication leg over network 125 for the benefit of a subscriber includes a call:
Placed from: A calling TD having an SLS service provider that is different from its primary service provider;
Directed to: A called TD having an SLS service provider that is different from its primary service provider;
The call between the calling TD and the SLS platform, as well as the call between the SLS platform and the called TD, may be a SIP call made via a data service provided to the calling TD or called TD from its respective primary service provider.

A fifth exemplary scenario in which it is envisioned that an embodiment of a second line service method may use a SIP enabled communication leg over network 125 for the benefit of a subscriber includes a call:
Placed from: A calling TD having an SLS service provider that is different from its primary service provider;
Directed to: A called TD having only a primary service provider;
The call between the calling TD and the SLS platform may be a SIP call made via a data service provided to the calling TD from its primary service provider.

In other embodiments of a second line service system, it is envisioned that a provider may be the primary service provider and the second line service provider for a given SLS subscriber. Embodiments of a second line service in which a single provider is both the primary service provider and the second line service provider for a subscriber may be termed Direct Second Line Number ("DSLN") services. An advantage of Direct Second Line Number embodiments is that a subscriber may have multiple phone numbers associated with one device using a single universal subscriber identity module ("USIM") or subscriber identity module ("SIM").

An first exemplary scenario in which it is envisioned that an embodiment of a DSLN service method may use CAP signaling for a communication leg with a subscriber whose provider is a primary service provider and a second line service provider includes a call:
Placed from: A calling TD having an SLS service provider;
Directed to: The SLS number of a called TD that has a primary service provider that is also the second line service provider;

A second exemplary scenario in which it is envisioned that an embodiment of a DSLN service method may use CAP signaling for a communication leg with a subscriber whose provider is a primary service provider and a second line service provider includes a call:
Placed from: A calling TD having only a primary service provider;
Directed to: The SLS number of a called TD that has a primary service provider that is also the second line service provider;

A third exemplary scenario in which it is envisioned that an embodiment of a DSLN service method may use CAP signaling for a communication leg with a subscriber whose provider is a primary service provider and a second line service provider includes a call:
Placed from: A calling TD using its SLS number and having an SLS service provider that is also its primary service provider;

Directed to: The SLS number of a called TD that has a primary service provider that is also the second line service provider;

A fourth exemplary scenario in which it is envisioned that an embodiment of a DSLN service method may use CAP signaling for a communication leg with a subscriber whose provider is a primary service provider and a second line service provider includes a call:
Placed from: A calling TD using its SLS number and having an SLS service provider that is also its primary service provider;
Directed to: The SLS number of a called TD;

A fifth exemplary scenario in which it is envisioned that an embodiment of a DSLN service method may use CAP signaling for a communication leg with a subscriber whose provider is a primary service provider and a second line service provider includes a call:
Placed from: A calling TD using its SLS number and having an SLS service provider that is also its primary service provider;
Directed to: The primary number of a called TD;

In the above scenarios, instead of using only ISUP signaling, a DSLN embodiment may use CAP signaling between a TD and the SLS platform to give the appearance that the second line number is a number associated with the physical TD from which it originated. Advantageously, this appearance may apply to billing records and called/calling number information to be displayed on a called party's TD.

In still other embodiments of a second line service system and method, it is envisioned that variations of the above scenarios may exist where a user having a primary service provider and second line service provider may play calls to, or receive calls from, a user whose primary service provider is also the second line service provider. That is, it is envisioned that a user of a cross-carrier second number may place calls between a user of a direct second number. In such scenarios, it is envisioned that the SLS platform may communicate with the cross-carrier second line user via SIP or ISUP and the direct second line user via CAP.

FIGS. 7A-7D collectively illustrate an exemplary method 700 for routing calls with a session initiated protocol ("SIP") between a calling telecommunications device (which may or may not have its own second line service) and a called telecommunications device (which may or may not have its own second line service). Although the method 700 is being described in the context of communication legs using SIP instead of ISUP, it will be understood that the method is not limited to just using SIP. As explained above, depending on whether a particular calling or called party is a cross-carrier second line number user (i.e., the primary service provider is different from the second line service provider) or a direct second line number user (i.e., the primary service provider and the second line service provider are the same provider), embodiments of the systems and methods may use CAP protocols and/or other protocols that would occur to those with skill in the art.

At block 702, a communication is directed to and received by an SLS platform 115. Next, at decision block 704, the SLS platform 115 determines whether the communication originated from a calling party seeking to connect to a subscriber's device, i.e. whether a calling party has dialed an SLS number associated with an active subscriber to the SLS service provided by SLS platform 115. Notably, if the calling party device has a second line service, and the communication received by the SLS platform 115 at block 702 was a call made from the SLS module of the calling party TD, the communication between calling party TD and SLS platform 115 may be a SIP call placed via the data service associated with the primary service provider of the calling party.

Figure 7A:
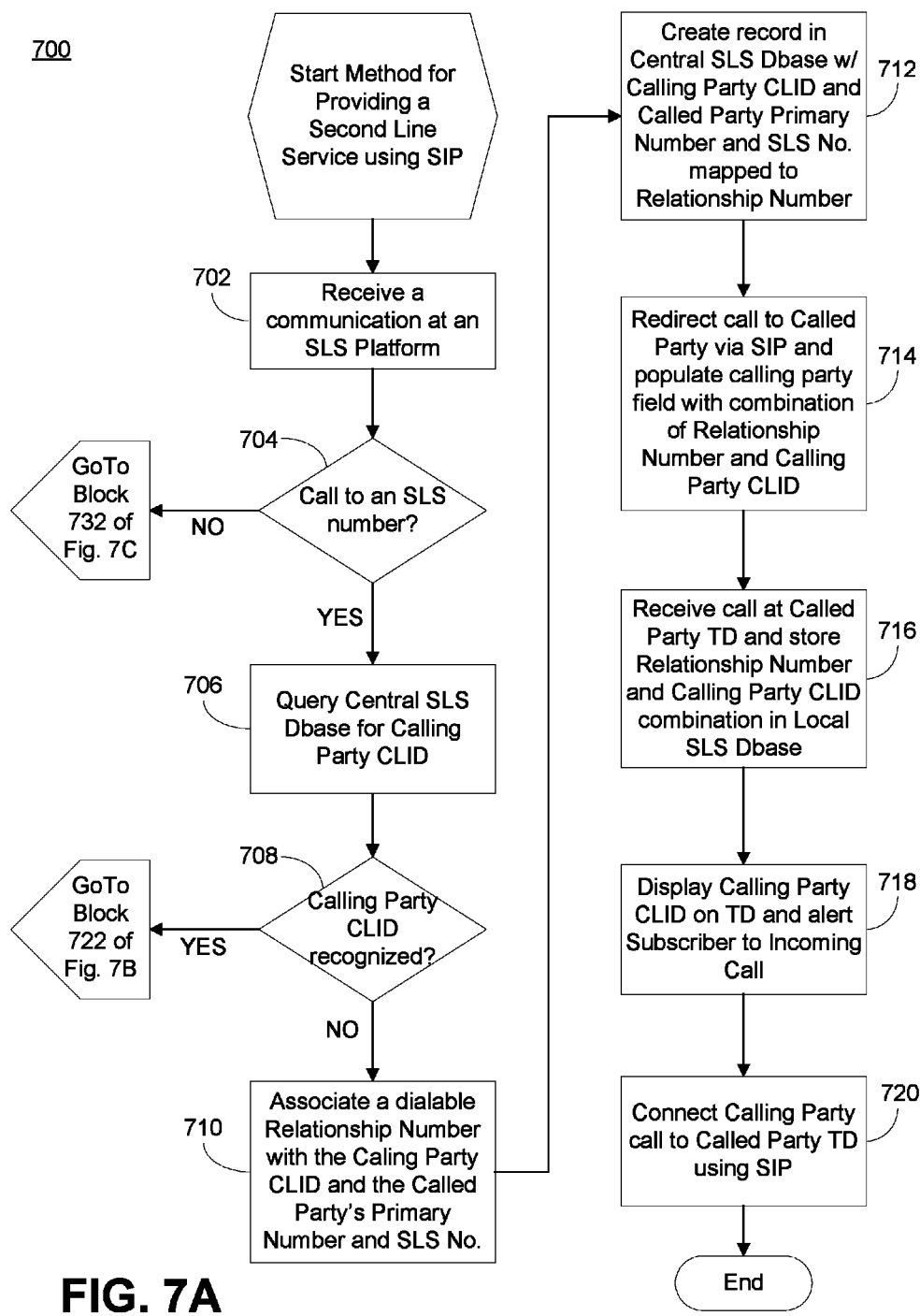
FIGS. 7A-7D collectively illustrate an exemplary method for routing calls with a session initiated protocol ("SIP") between a calling telecommunications device (which may or may not have its own second line service) and a called telecommunications device (which may or may not have its own second line service).
Figure 7B:
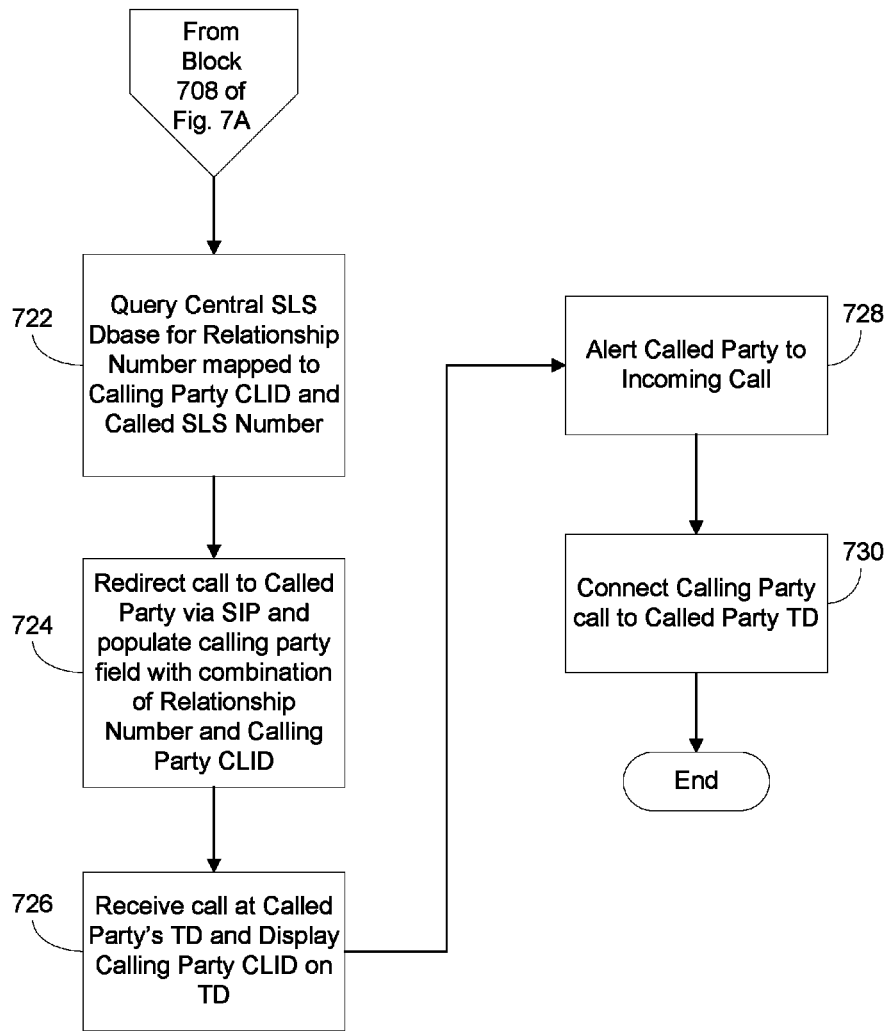
Figure 7C:
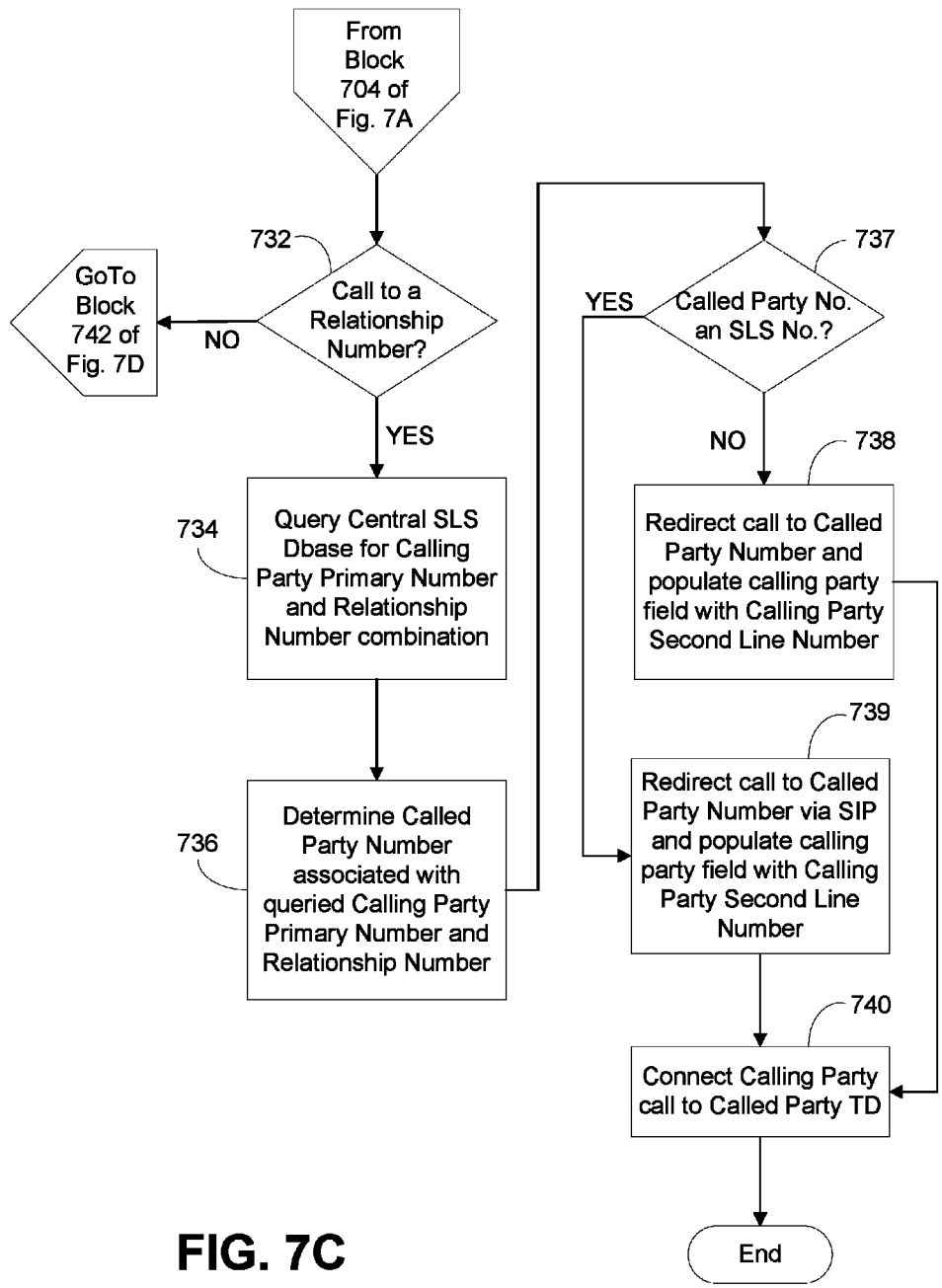

Returning to the method 700 at decision block 704, if the communication was not a call to an SLS number of an active subscriber, then the "no" branch is followed to block 732 of FIG. 7C. If the communication was, in fact, a call directed to an SLS number, then the "yes" branch is followed to block 706. Notably, if a communication is directed to the SLS platform 115, one of ordinary skill in the art will recognize that the communication was either a call placed to an SLS number of a subscriber (if dialed by a third party), a call placed to a relationship number (if originating from an SLS client of a subscriber TD, or a communication over a data channel (if originating from an SLS client of a subscriber TD)

At block 706, the SLS platform 115 queries central SLS database 116 for the calling line ID ("CLID"), i.e. the phone number of the calling party, in association with the SLS number that caused the call to be routed to the SLS platform 115. Notably, it will be understood that, if the calling party TD has its own SLS service the CLID may be the SLS number associated with the calling party TD if the call was placed from its SLS module. If at decision block 708, the SLS platform 115 successfully queries the calling party CLID and called party SLS number combination, then the "yes" branch is followed to block 722 of FIG. 7B. If the calling party CLID and called party SLS number combination are not successfully queried, then the "no" branch is followed to block 710.

At block 710, the SLS platform 115 may associate a new dialable relationship number with the calling party number and the called party's primary number and SLS number. At block 712, the central SLS database 116 is updated to include the newly created record—the calling party is listed as a contact of the called party (e.g., see the Subscriber Relationship ID Table 310). At block 714, the call may be redirected to the called party via SIP, thereby routing it to the called party's TD using a data service associated with the primary service provider of the called party TD. In redirecting the call, the calling party field may be populated in some embodiments with a combination of the newly assigned relationship number and the calling party CLID.

At block 716, the called party TD may receive the redirected call via an SLS module and update its local SLS database to include the newly assigned relationship number in association with the calling party CLID. At block 718, the calling party CLID is displayed to the called party and the called party is alerted to the incoming call. Notably, it is envisioned that displaying the CLID may include rendering the CLID itself, rendering a picture of the calling party, rendering a name, etc. as is understood by those with skill in the art of graphical user displays and interfaces. At block 720, the call is connected by the SLS platform 115 using SIP when the called party answers the call with his SLS enabled TD.

It is envisioned that the steps taken at block 714 of the method 700 may differ in some embodiments. For instance, when a third party call to a subscriber SLS number is received at the SLS platform 115, and the third party calling number is not yet associated with a relationship number, the SLS platform 115 may assign a next relationship number as described relative to blocks 710-712 then redirect the call to the subscriber TD 110. The SLS module 105 of the subscriber TD 110, having no record of the new relationship number in its local database 106, may display the calling number as "unknown caller" on the display of the subscriber TD 110. At the same time, the SLS module 105 may establish a data connection over network 125 with the SLS platform 115 for the purpose of acquiring the third party calling number associated with the new relationship number. Once the actual third party calling number is acquired, the SLS module 105 may update the local database 106 and change the display from "unknown caller" to the actual third party calling number.

Turning now to FIG. 7B, if the "yes" branch is followed from decision block 708 of FIG. 7A, at block 722 the SLS platform 115 queries the central SLS database 116 for the relationship number that maps to the combination of the calling party CLID and called SLS number. At block 724, the called party's TD is called by the SLS platform 115 using SIP. At block 726, the call is received at the called party's SLS enabled TD and its associated SLS module recognizes that the call originated from the SLS platform 115. It is envisioned that some embodiments of a SLS module 105 may recognize that an incoming call is from the SLS platform 115 by virtue of the call originating from a relationship number. At block 726, the relationship number in the calling party field of the SIP call signaling may cause the SLS module to handle the call and display the associated calling party CLID for the benefit of the called party. Notably, it is envisioned that the SLS module may recognize the call as an SLS call simply by virtue of the call being a SIP call.

At block 728 the called party is alerted to the incoming call and at block 730 the call is connected to the called party TD by the SLS platform 115 via SIP when the subscriber answers the call. It is envisioned that, if the called party elects not to answer a call to the SLS number, the SLS module in the called party TD in some embodiments may use a voicemail service or message service in response to the unanswered call. That is, it is envisioned that an SLS service may provide features and services dedicated to the SLS subscriber and separate from similar features and services associated with the subscriber's primary number.

Turning now to FIG. 7C, if the "no" branch is followed from block 704 of FIG. 7A, at decision block 732 the SLS platform 115 determines whether the communication is a call that is directed to a relationship number. Notably, if the communication is a call that is directed to a relationship number, then it must have originated from a TD associated with a subscriber of the SLS service. If the communication was not routed to the SLS platform 115 because of being a call directed to a relationship number, the "no" branch is followed to block 742 of FIG. 7D. If, however, the call was routed to the SLS platform 115 because it was directed to a relationship number then the "yes" branch is followed to block 734. Notably, it is envisioned that in some embodiments the SLS platform 115 may recognize that the communication originated from a subscriber of the SLS service simply by virtue of the communication being a SIP based call.

At block 734, the central SLS database 116 is queried for the relationship number in combination with the subscriber primary number from which the call originated. At block 736, the SLS platform 115 may determine the actual third party number (called party number) with which the relationship number and the subscriber primary number combination is associated.

Notably, although for illustrative purposes the present embodiments include only a single SLS number being associated with a subscriber TD, it is envisioned that a subscriber TD may have multiple SLS numbers associated with it in some embodiments. In such cases, as one of ordinary skill in the art will recognize, the various queries described herein may further be based on combinations of numbers that include one of the multiple SLS numbers which are associated with a given TD. For instance, in a scenario where a subscriber TD contacts the SLS platform via an out-of-band channel (such as SMS, MMS, USSD, IP, etc.) to acquire a relationship number, connect to a call to a third party associated with a relationship number, etc., the subscriber TD may at that time also provide data indicating from which SLS number the call should be completed. Consequently, based on a combination of the indicated SLS number and the relationship number and the primary service number, the call may ultimately redirected from the SLS platform to the third party TD per variations of the methods described herein.

Furthering the example of an embodiment where the subscriber TD has multiple associated SLS numbers, the Subscriber Relationship ID Table (see FIG. 3A) may be expanded to include ranges of relationship numbers in association with certain SLS numbers. For example:

| SLS Number | Contact | R-Number | 3rd party number |
|---|---|---|---|
| 770.555.0001 | 1 | 678.222.0001 | 305.229.9999 |
| 770.555.0001 | 2 | 678.222.0002 | 212.777.8888 |
| 770.555.0001 | 3 | 678.222.0003 | 408.333.2222 |
| ... | ... | ... | ... |
| 770.555.0001 | 9999 | 678.222.9999 | Unused |
| 770.555.0050 | 1 | 678.333.0001 | 201.555.1234 |
| 770.555.0050 | 2 | 678.333.0002 | 408.333.2222 |
| 770.555.0050 | 3 | 678.333.0003 | 404.213.2133 |
| ... | ... | ... | ... |
| 770.555.0050 | 9999 | 678.333.9999 | Unused |

Based on these ranges, an SLS client in the subscriber TD will be able to determine the SLS number to which a call was directed from the relationship number used by the SLS server to complete the call to the subscriber TD. Similarly, when a call is placed from the subscriber TD, the SLS platform will be able to determine the actual third party calling number and the correct SLS number from a combination of the subscriber's primary service number and the relationship number. Referring to the table immediately above, range 222.XXXX for the relationship numbers maps to the subscriber's SLS number 770.555.0001 whereas range 333.XXXX for the relationship numbers maps to the subscriber's other SLS number 770.555.0050.

Returning to the method 700 at decision block 737, if the actual third party number determined at block 736 is also an SLS number (thus, both the calling party and the called party are SLS subscribers), the method may proceed to block 739 and the call redirected to the third party's actual number (which is also its SLS number) via SIP. If, however, at decision block 737 it is determined that the third party number is not an SLS number (thus the third party is not an SLS subscriber), then the method moves to block 738 and the SLS platform 115 redirects the call to the called party's TD via the PSTN. At block 740, the call is connected to the third party TD.

Figure 7D:
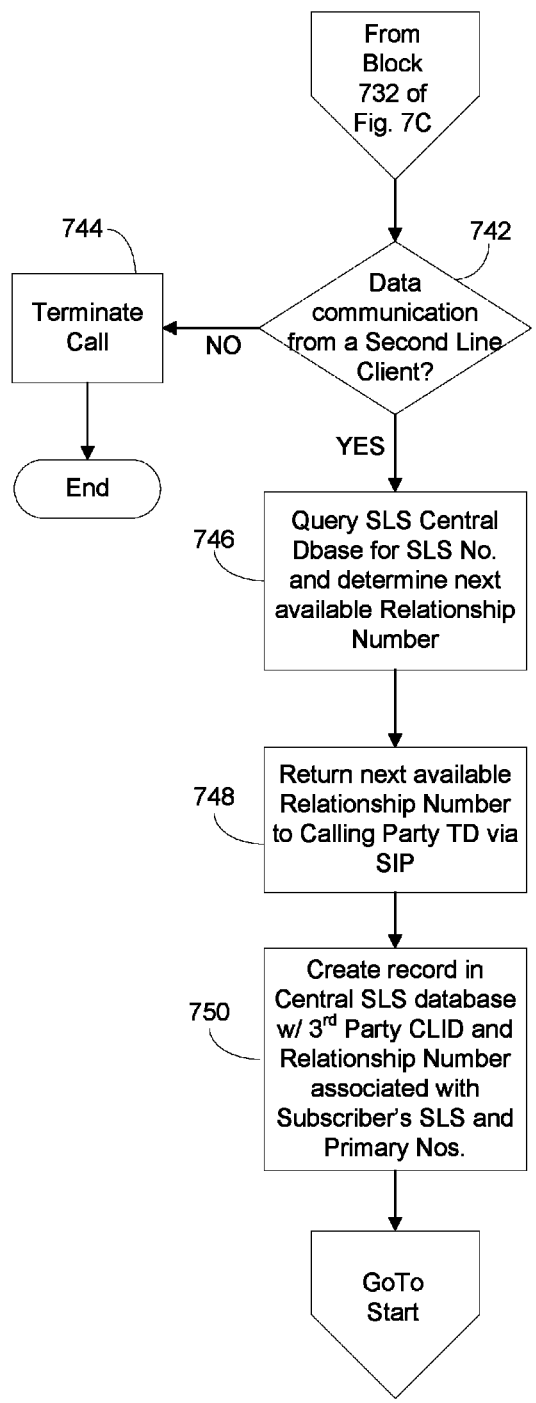

Turning now to FIG. 7D, if the "no" branch is followed from block 732 of FIG. 7C, at decision block 742 the SLS platform 115 determines whether the communication was a data communication that originated from an SLS client of a subscriber TD. If not, then it is assumed that it was an errant communication and the "no" branch is followed to block 744 and the communication is disconnected. If the communication was a data communication over network 125 that did originate from a second line client associated with a subscriber to the SLS service, then the "yes" branch is followed to block 746. At block 746, it is deduced by the SLS platform 115 that the subscriber associated with the calling SLS client desires to use the SLS service to call a third party with which no relationship number has been associated with the actual third party number. The SLS module 105 has provided the request for the new relationship number, along with the third party number it desires to call, to the SLS platform 115 via the communication.

Briefly referring back to previous blocks in the methods 700 and 400, if the SLS platform 115 was contacted by the SLS module 105 using a next relationship number identified by the module 105, then the central database 116 is updated with the next relationship number and the third party calling number (which may also have been provided to the SLS platform over a data connection) combination and the call is completed to the third party number. If the SLS platform 115 was contacted by SLS module 105 via a data connection in order to acquire a next relationship number, the central SLS database is queried to determine the next available relationship number for the calling party's given SLS number.

Returning to the method 700, at block 748 the determined next available relationship number is returned to the SLS module of the calling party TD via the data connection. At block 750, the central SLS database 116 is updated with the new relationship number and the third party CLID provided to the SLS platform by the SLS client 105 of the subscriber TD 110. The new relationship number is now associated in the central SLS database 116 with the subscriber primary number, the subscriber SLS number and the third party CLID. Notably, after blocks 748 and/or 750, the method 700 may return to the start of method 700 at block 702 as the SLS module 105 of the subscriber TD 110 has acquired a new relationship number in association with a third party CLID. Consequently, using the newly acquired relationship number may essentially start over the method 700 with the SLS platform receiving a communication. If so, the method 700 would follow to FIG. 7C where the communication was recognized as the subscriber TD 110 having placed a call to the new relationship number.

Certain steps or blocks in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Also, in some instances, multiple actions depicted and described as unique steps or blocks in the present disclosure may be comprised within a single step or block. Further, words such as "thereafter", "then", "next", "subsequently", etc. are not intended to limit the order of the steps or blocks. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for enabling a cellular mobile communications device that has a carrier assigned primary number to include one or more additional network accessible numbers such that calls to the one or more additional network numbers will terminate at the cellular mobile communications device and, the cellular mobile communications device operates originate calls from the one or more additional network accessible numbers all within the same cellular mobile communications device, the method comprising:

assigning an additional network accessible number to a first cellular mobile communications device, wherein the first cellular mobile communications device includes a second line calling application;

selecting a first relationship number that is associated with the primary number of the first mobile communications device, the additional network accessible number and a third party calling number, wherein the first relationship number is a network recognizable number;

forwarding the selected relationship number and the third party calling number to the first mobile communications device;

receiving a call initiation into a telephone network from the first mobile communications device, wherein the call initiation identifies the first relationship number as the dialed number;

the telephone network identifying the first relationship number as a valid network accessible number that is serviced by a specialized platform;

the telephone network routing the call initiation to the specialized platform;

the specialized platform identifying the additional network accessible number and the third party number associated with the first relationship number; and the specialized platform completing the call initiation by establishing a call request to the third party number with the additional network accessible number utilized as the calling line identifier, receiving a call initiation into the telephone network from a second cellular mobile communications device, wherein the call initiation identifies the additional network accessible number of the first cellular mobile communications device as the dialed number;

the telephone network identifying the additional network accessible number as a valid network accessible number that is serviced by the specialized platform;

the telephone network routing the call initiation to the specialized platform;

the specialized platform identifying a previously assigned relationship number that is associated with the additional network accessible number and the calling line identifier of the second mobile communications device;

the specialized platform completing the call initiation by establishing a call request to the primary number of the first mobile communications device with the previously assigned relationship number utilized as the calling line identifier, wherein the first mobile communications device operates lookup the previously assigned relationship number to identify the call as being directed to the additional network accessible number and origination from the second mobile communications device;

if the specialized platform does not identify a previously assigned relationship number that is associated with the additional network accessible number and the calling line identifier of the second mobile communications device, selecting a second relationship number and associating the selected second relationship network with the additional network accessible number and the calling line identifier of the second mobile communications device;

forwarding the selected second relationship number and the calling line identifier of the second mobile communications device to the first mobile communications device;

the specialized platform completing the call initiation by establishing a call request to the primary number of the first mobile communications device with the selected second assigned relationship number utilized as the calling line identifier, wherein the first mobile communications device operates to lookup the selected second assigned relationship number to identify the call as being directed to the additional network accessible number and originating from the second mobile communications device.

2. The method of claim 1, wherein the specialized platform completes the call initiation over a cellular communications voice channel.

3. The method of claim 1, wherein the specialized platform forwards the first relationship number and the third party calling number to the first mobile communications device over a data channel.

4. The method of claim 1, wherein the specialized platform completes the call initiation over a cellular communications voice channel.

* * * * *